(12) United States Patent
Shakib et al.

(10) Patent No.: US 10,127,722 B2
(45) Date of Patent: Nov. 13, 2018

(54) MOBILE CAPTURE VISUALIZATION INCORPORATING THREE-DIMENSIONAL AND TWO-DIMENSIONAL IMAGERY

(71) Applicant: Matterport, Inc., Mountain View, CA (US)

(72) Inventors: Babak Robert Shakib, Menlo Park, CA (US); Kevin Allen Bjorke, Santa Clara, CA (US); Matthew Tschudy Bell, Palo Alto, CA (US)

(73) Assignee: Matterport, Inc., Mountain View, CA (US)

( * ) Notice: Subject to any disclaimer, the term of this patent is extended or adjusted under 35 U.S.C. 154(b) by 0 days.

(21) Appl. No.: 15/199,853

(22) Filed: Jun. 30, 2016

(65) Prior Publication Data

US 2018/0144547 A1 May 24, 2018

Related U.S. Application Data

(60) Provisional application No. 62/187,201, filed on Jun. 30, 2015.

(51) Int. Cl.
*G06T 15/40* (2011.01)
*G06T 19/00* (2011.01)
(Continued)

(52) U.S. Cl.
CPC .......... *G06T 19/003* (2013.01); *G06F 3/0485* (2013.01); *G06F 3/04815* (2013.01);
(Continued)

(58) Field of Classification Search
CPC ..... G06F 3/0485; G06T 15/40; G06T 15/503; G06T 17/20
See application file for complete search history.

(56) References Cited

U.S. PATENT DOCUMENTS 5,552,806 A 9/1996 Lenchik
5,611,025 A 3/1997 Lorensen et al.
(Continued)

OTHER PUBLICATIONS

Non-Final Office Action for U.S. Appl. No. 14/219,906, dated Mar. 2, 2017, 40 pages.
(Continued)

*Primary Examiner* — Robert J Craddock
(74) *Attorney, Agent, or Firm* — Amin, Turocy & Watson, LLP

(57) ABSTRACT

This application generally relates to systems and methods for generating and rendering visualizations of an object or environment using 2D and 3D image data of the object or the environment captured by a mobile device. In one embodiment, a method includes providing, by the system, a representation of a 3D model of an environment from a first perspective of the virtual camera relative to the 3D model, receiving, by the system, input requesting movement of the virtual camera relative to the 3D model, and selecting, by the system, a first 2D image from a plurality of two dimensional images associated with different capture positions and orientations relative to the 3D model based on association of a capture position and orientation of the first 2D image with a second perspective of the virtual camera relative to the 3D model determined based on the movement.

23 Claims, 15 Drawing Sheets

(51) Int. Cl.
*G06T 15/20* (2011.01)
*G06F 3/0481* (2013.01)
*G06F 3/0485* (2013.01)
*G06T 3/20* (2006.01)
*G06T 15/60* (2006.01)
*G06T 15/50* (2011.01)
*G06T 17/20* (2006.01)

(52) U.S. Cl.
CPC .............. *G06T 3/20* (2013.01); *G06T 15/20* (2013.01); *G06T 15/205* (2013.01); *G06T 15/40* (2013.01); *G06T 15/503* (2013.01); *G06T 15/60* (2013.01); *G06T 17/20* (2013.01)

(56) References Cited

U.S. PATENT DOCUMENTS

| | | | |
|---|---|---|---|
| 5,671,381 A | 9/1997 | Strasnick et al. | |
| 6,130,670 A * | 10/2000 | Porter | G06T 15/40 345/421 |
| 6,346,938 B1 | 2/2002 | Chan et al. | |
| 6,525,731 B1 | 2/2003 | Suits et al. | |
| 7,242,408 B1 * | 7/2007 | Dunn | G06T 15/04 345/426 |
| 8,200,594 B1 | 6/2012 | Bleiweiss | |
| 8,339,394 B1 | 12/2012 | Lininger | |
| 8,902,288 B1 | 12/2014 | Fan et al. | |
| 9,179,252 B1 | 11/2015 | Liu et al. | |
| 9,244,940 B1 | 1/2016 | Donsbach et al. | |
| 9,671,938 B2 | 6/2017 | Seitz et al. | |
| 2002/0140698 A1 | 10/2002 | Robertson et al. | |
| 2003/0052877 A1 | 3/2003 | Schwegler et al. | |
| 2004/0041812 A1 | 3/2004 | Roberts et al. | |
| 2004/0046760 A1 | 3/2004 | Roberts et al. | |
| 2005/0151751 A1 | 7/2005 | Hong et al. | |
| 2006/0066612 A1 * | 3/2006 | Yang | G06T 15/205 345/419 |
| 2006/0132482 A1 | 6/2006 | Oh | |
| 2006/0227134 A1 | 10/2006 | Khan et al. | |
| 2007/0024612 A1 | 2/2007 | Balfour | |
| 2007/0110338 A1 | 5/2007 | Snavely et al. | |
| 2007/0203545 A1 | 8/2007 | Stone et al. | |
| 2008/0028341 A1 | 1/2008 | Szeliski et al. | |
| 2008/0088621 A1 | 4/2008 | Grimaud et al. | |
| 2008/0106594 A1 | 5/2008 | Thrun | |
| 2008/0143727 A1 | 6/2008 | Oh et al. | |
| 2008/0247636 A1 | 10/2008 | Davis et al. | |
| 2008/0291217 A1 | 11/2008 | Vincent et al. | |
| 2009/0005981 A1 | 1/2009 | Forstall et al. | |
| 2009/0079732 A1 * | 3/2009 | Fitzmaurice | G06F 3/04815 345/419 |
| 2009/0129690 A1 | 5/2009 | Marcellin et al. | |
| 2009/0274391 A1 | 11/2009 | Arcas et al. | |
| 2009/0281728 A1 | 11/2009 | Mishra et al. | |
| 2009/0289937 A1 | 11/2009 | Flake et al. | |
| 2010/0045666 A1 | 2/2010 | Kommann et al. | |
| 2010/0045678 A1 | 2/2010 | Reid | |
| 2010/0077311 A1 | 3/2010 | Santoro et al. | |
| 2010/0171741 A1 | 7/2010 | Brill et al. | |
| 2010/0182400 A1 | 7/2010 | Nelson et al. | |
| 2010/0188503 A1 | 7/2010 | Tsai et al. | |
| 2010/0201684 A1 | 8/2010 | Yadav et al. | |
| 2010/0214284 A1 | 8/2010 | Rieffel et al. | |
| 2010/0265248 A1 | 10/2010 | McCrae et al. | |
| 2010/0268457 A1 | 10/2010 | McCrae et al. | |
| 2011/0007962 A1 | 1/2011 | Johnson et al. | |
| 2011/0010650 A1 | 1/2011 | Hess et al. | |
| 2011/0187723 A1 | 8/2011 | Chen et al. | |
| 2011/0249757 A1 | 10/2011 | Newton et al. | |
| 2011/0283223 A1 | 11/2011 | Vaittinen et al. | |
| 2011/0310087 A1 | 12/2011 | Wright, Jr. et al. | |
| 2011/0310088 A1 | 12/2011 | Adabala et al. | |
| 2011/0316976 A1 | 12/2011 | Nakajima et al. | |
| 2011/0320116 A1 | 12/2011 | DeMaio et al. | |
| 2012/0019522 A1 * | 1/2012 | Lawrence | F41G 3/02 345/419 |
| 2012/0030630 A1 | 2/2012 | Grossman et al. | |
| 2012/0044247 A1 | 2/2012 | Naimark | |
| 2012/0050288 A1 | 3/2012 | Crucs | |
| 2012/0116728 A1 | 5/2012 | Shear et al. | |
| 2012/0127170 A1 | 5/2012 | Varadhan | |
| 2012/0133640 A1 | 5/2012 | Chin et al. | |
| 2012/0139915 A1 | 6/2012 | Muikaichi et al. | |
| 2012/0155744 A1 | 6/2012 | Kennedy et al. | |
| 2012/0209574 A1 | 8/2012 | Moreau et al. | |
| 2012/0316441 A1 | 12/2012 | Toma et al. | |
| 2012/0327184 A1 | 12/2012 | Zhu et al. | |
| 2013/0009954 A1 | 1/2013 | Ofek et al. | |
| 2013/0016896 A1 | 1/2013 | Seida | |
| 2013/0044139 A1 * | 2/2013 | Hernandez Esteban | G06T 19/003 345/676 |
| 2013/0179841 A1 | 7/2013 | Mutton et al. | |
| 2013/0187952 A1 | 7/2013 | Berkovich et al. | |
| 2013/0207963 A1 | 8/2013 | Stirbu et al. | |
| 2013/0271462 A1 | 10/2013 | Frank | |
| 2013/0300656 A1 | 11/2013 | Roegelein et al. | |
| 2013/0321392 A1 | 12/2013 | van der Merwe et al. | |
| 2013/0321397 A1 * | 12/2013 | Chen | G06T 17/05 345/419 |
| 2013/0321401 A1 | 12/2013 | Piemonte et al. | |
| 2014/0002439 A1 | 1/2014 | Lynch | |
| 2014/0002440 A1 | 1/2014 | Lynch | |
| 2014/0062998 A1 | 3/2014 | Ofstad et al. | |
| 2014/0218360 A1 | 8/2014 | Dalgaard Larsen | |
| 2014/0240318 A1 | 8/2014 | Coombe et al. | |
| 2014/0314322 A1 | 10/2014 | Snavely et al. | |
| 2015/0009327 A1 | 1/2015 | Love | |
| 2015/0269785 A1 | 9/2015 | Bell et al. | |
| 2016/0127690 A1 | 5/2016 | Kaehler et al. | |
| 2016/0210788 A1 | 7/2016 | Kasahara | |
| 2016/0267067 A1 | 9/2016 | Mays et al. | |
| 2016/0328373 A1 | 11/2016 | Rhoades et al. | |
| 2017/0352196 A1 | 12/2017 | Chen et al. | |

OTHER PUBLICATIONS

International Search Report & Written Opinion for International Patent Application Serial No. PCT/US15/20453, dated Jun. 25, 2015, 11 pages.

Office Action from U.S. Appl. No. 14/219,906, dated Nov. 18, 2015, 29 pages.

Office Action from U.S. Appl. No. 14/219,906, dated Jun. 21, 2016, 35 pages.

Office Action for U.S. Appl. No. 13/925,772 dated Nov. 28, 2014, 10 pages.

Final Office Action for U.S. Appl. No. 13/925,772 dated May 5, 2015, 31 pages.

Office Action for U.S. Appl. No. 13/925,772 dated Feb. 3, 2016, 37 pages.

European Office Action from EP Application Serial No. 15764342.0, dated Oct. 28, 2016, 2 pages.

Office Action for U.S. Appl. No. 13/925,772 dated Aug. 16, 2016, 41 pages.

Bourke, "Interpolation methods", 1999, available at http://paulbourke.net/miscelianeous/interpolation/, pp. 1-12.

"Tu Wien, ""Computer-Assisted Animation""", 2002, available at https://www.cg.tuwien.ac.at/courses/Animation/B_Computer_Assisted_Animation.pdf, pp. 1-20".

Hsieh et al., "Photo Navigator", 2008, MM '08 Proceedings of the 16th ACM international conference on Multimedia, pp. 419-428.

Notice of Allowance for U.S. Appl. No. 13/925,772, dated Jun. 1, 2017, 32 pages.

Non-Final Office Action for U.S. Appl. No. 14/219,906 dated Apr. 4, 2018, 22 pages.

Non-Final Office Action for U.S. Appl. No. 15/272,337 dated Feb. 2, 2018, 66 pages.

Final Office Action for U.S. Appl. No. 14/219,906 dated Oct. 19, 2017, 43 pages.

(56) References Cited

OTHER PUBLICATIONS

Extended European Search Report Issued in EP Patent application No. 15764342.0 dated Aug. 11, 2017, 9 Pages.
WilloxH: "Microsoft Photosynth", Jul. 27, 2006, Retrieved from the Internet:URL:https://www.youtube.com;watch?v=p16frKJLVi0 [retrieved on Dec. 2, 2015], 1 page.
Notice of Allowance received for U.S. Appl. No. 14/219,906 dated Jul. 10, 2018, 55 pages.
Snavely et al., "Photo Tourism: Exploring Photo Collections in 3D", 2006, SIGGRAPH '06 ACM SIGGRAPH, pp. 835-846.
Notice of Allowance received for U.S. Appl. No. 15/272,337 dated Jul. 17, 2018, 46 pages.

* cited by examiner

MOBILE CAPTURE VISUALIZATION INCORPORATING THREE-DIMENSIONAL AND TWO-DIMENSIONAL IMAGERY

RELATED APPLICATION

This patent application claims priority to U.S. Provisional Patent Application No. 62/187,201, filed on Jun. 30, 2015, and entitled "MOBILE CAPTURE VISUALIZATION INCORPORATING THREE-DIMENSIONAL AND TWO-DIMENSIONAL IMAGERY," the entirety of which is incorporated by reference herein.

TECHNICAL FIELD

This application generally relates to systems and methods for generating and rendering visualizations of an object or environment using two-dimensional (2D) and three-dimensional (3D) image data of the object or the environment captured by a mobile device.

BACKGROUND

Various technologies exist for capturing and reconstructing three-dimensional data (3D) of an object or environment (e.g., a building, or a room within a building). The input image data of these existing technologies may come from a two-dimensional (2D) image sensor or a 3D sensor that captures depth information as well as 2D imagery (pixel color, texture, etc.), such as a time-of-flight camera, a structured light camera, or a stereo camera. The 3D reconstruction process often involves finding a position and orientation of the 2D camera when it captured various images.

The 3D reconstructions made by these existing processes are often imperfect. For example, existing 3D modeling processes can have difficulty handling certain types of objects, such as thin objects, highly reflective objects, partially or completely transparent objects, objects with highly complex geometry, or very distant objects. Additionally, the 3D models generated by these existing processes may not have the same level of texture resolution as the raw 2D imagery associated therewith, for example due to hardware limitations.

Accordingly, rather than viewing an imperfect view of a 3D reconstruction of an object or environment, it is desirable to be able to view the 2D images or 2D panoramas of the object or environment that were used to generate the 3D reconstruction, if available. More particularly, a smooth interface is desired for switching from interactive free exploration of the 3D model to viewing desired 2D imagery and back again. Such a smooth interface has been previously generated using 2D and 3D image data captured from sophisticated cameras fixed to a tripod and configured to rotate 360 degrees relative to the object or environment at various fixed points and angles. These cameras can generate structured panoramic imagery at a specific capture point. The smooth interface combines a 3D mesh of the object or environment along with the several 360 degree photographic 2D panoramas of the object or environment.

Mobile devices (e.g., tablets, smartphones, wearable devices, etc.) are becoming configured with 2D and 3D sensors capable of capturing color and depth data. Thus, mobile devices are becoming capable of capturing image data of a real world environment that can be used to generate a 3D model of the environment. However, for mobile devices, the method of image data capture is significantly different than that of the sophisticated cameras attached to a rotating tripod. For example, when capturing image data of an environment using a handheld mobile device, it is impractical for a user to capture a series of structured 360 panoramas of the environment. Rather, the captured image data is more free form as the mobile capture device moves about or around the environment, capturing images from various non-uniform positions and angles. Further the field of view offered by a mobile capture device is significantly less than that of sophisticated cameras configured to capture structured panoramas. Accordingly, the techniques used to generate a smooth interface that facilitates viewing and navigating a 3D model using 2D and 3D image data captured from cameras configured to generate several structured 360 degree photographic 2D panoramas are insufficient when applied to image data captured using a mobile device.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
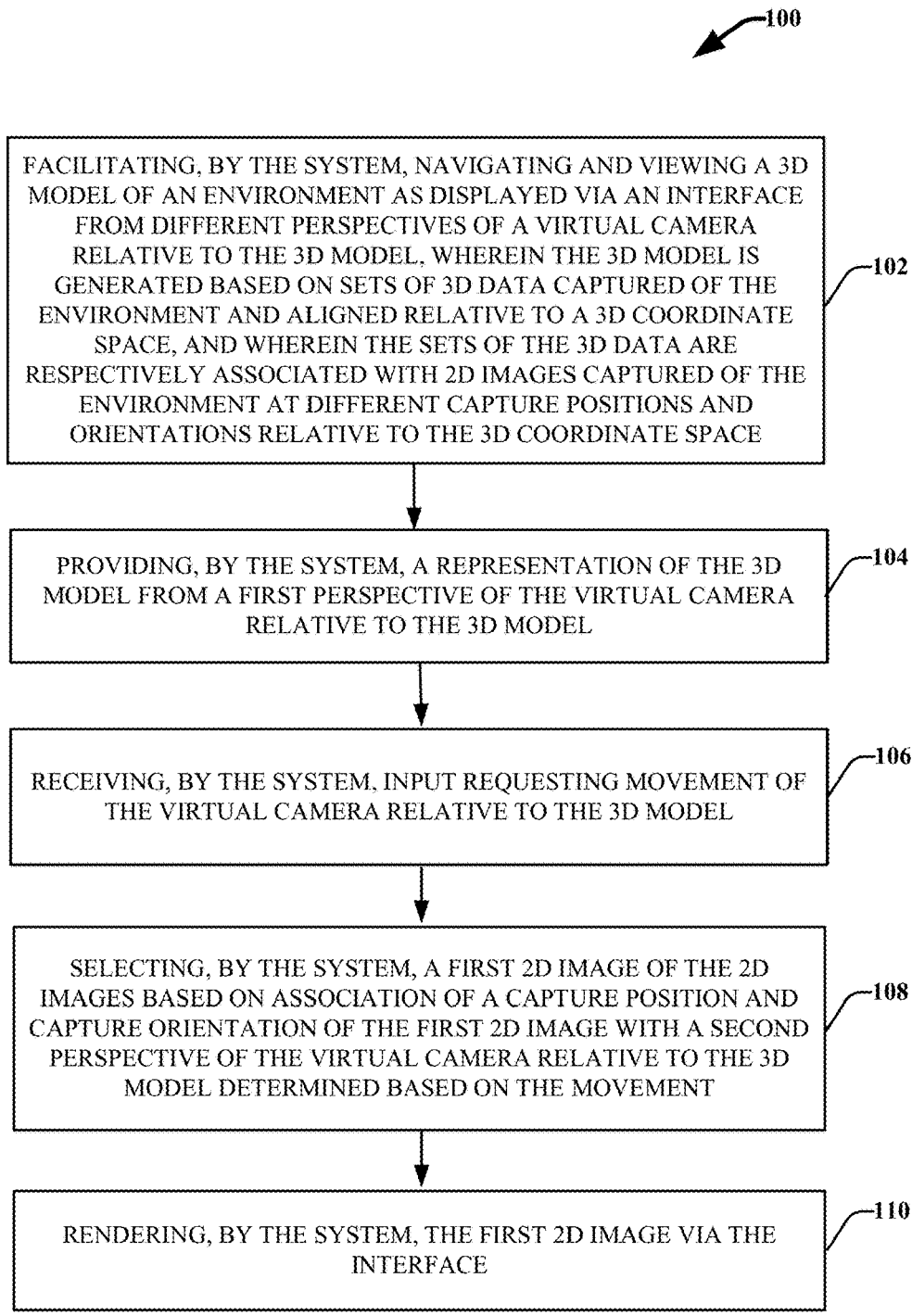
FIG. 1 presents a high level flow diagram of an example process that facilitates viewing and navigating a three-dimensional model of an object or environment in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject disclosure is directed to systems, methods and computer readable media that provide new tools to let users view, navigate, and interact with mobile 3D scans in a high fidelity way. In particular, the subject disclosure provides systems and methods that facilitate generating 3D virtual scenes from real world image data captured on a mobile device and facilitating smooth navigation within the 3D virtual scenes while providing high fidelity imagery of various perspectives of the 3D virtual scenes. In various embodiments, the mobile device is a handheld device. However the subject techniques can be applied to non-handheld movable cameras (e.g., wearable imaging devices, device fixed to a robotic arm or movable mount, etc.). The disclosed techniques build upon the ability to reconstruct a 3D scene as a textured 3D model or mesh and unify the 3D mesh with the 2D photographic frames of the original capture to provide maximum visual fidelity.

In various embodiments, a mobile capture scan of an object or environment can include a wide range of single-direction 2D view frames (e.g., a dozen, hundreds, thousands, etc.), each with their own distinct location, orientation, exposure, and on occasion motion blur. Each of the 2D image frames may also include 3D data associated therewith (e.g., depth data). Unlike structured panoramas generated by a camera connected to a fixed rotating tripod device (which have a clear "walkabout" structure), consecutive mobile scan frames can be captured from varying angles, heights, and/or locations. (i.e., the user taking the mobile scan generally does not hold the camera in a stable constant positions for each capture, such as can be accomplished using a tripod). Also, with mobile captures, the users tend to get close to objects and go around them to capture more detail as often the limited range of sensors in mobile devices requires this behavior. However, while it is desirable to allow the user to view a scene from close up, it is also desirable to let the user view the scene with a wider field of view to get a better sense for the overall space while maintaining visual quality by using the available 2D imagery.

The disclosed systems and methods provide techniques for viewing and navigating smoothly and quickly through this complex sort of media. In various embodiments, the mobile captured 2D and 3D image data is used to generate a rough or partial 3D model or mesh of an object or environment from which the data was captured, along with an array of color views distributed through space. This reconstructed 3D model provides a framework for user navigation about and/or through the object or environment and can also be viewed directly as a simple 3D model. Captured 2D views of the object or environment are further rendered, combined, and/or projected onto the 3D model based on the manner in which the user navigates through and/or around the model to provide as much image fidelity as possible (e.g., when a selected perspective for viewing a 3D representation of the object or environment corresponds to a location, orientation, exposure, etc. of an original 2D captured image of the object or environment). In addition, the disclosed systems and methods provide techniques for generating and rendering completely novel 2D and 3D views of the object or environment from perspectives of a viewer/camera at a position, orientation, exposure, etc. that was not included in the mobile capture data (e.g., a broader out view of an environment created from several up close views), and/or when the original captured 2D and 3D image data is broken, blurred, sparse or highly unstructured.

Referring now to the drawings, with reference initially to FIG. 1, presented is a high level flow diagram of an example process 100 that facilitates viewing and navigating a 3D model an object or environment in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

At 102, a system including a processor facilitates navigating and viewing a 3D model of an environment as displayed via an interface from different perspectives of a virtual camera relative to the 3D model, wherein the 3D model is generated based on sets of 3D data captured of the environment and aligned relative to a 3D coordinate space, and wherein the sets of the 3D data are respectively associated with 2D images captured of the environment at different capture positions and orientations relative to the 3D coordinate space. For example, in various embodiments, a system is provided that generates a 3D model of an environment using sets of 3D data respectively having points associated with depth or distance information relative to a capture position and orientation that have been aligned relative to a 3D coordinate space. This reconstructed 3D model provides a framework for user navigation through the space and can also be viewed directly as a simple 3D model. The sets of 3D data are respectively associated with 2D images of the environment captured by a camera at different positions and orientations relative to the three-dimensional coordinate space. In an aspect, the system is provided on the device including the camera that generated the captured 3D and 2D data. In another aspect, the system is located at a device remote from the camera (e.g., a remote server). Still in other aspects, one or more components of the system are located on the camera and one or more additional components of the system are located at another device.

For example, in some embodiments, the camera is included on a mobile device, such as a handheld smartphone or tablet. The camera can further be capable of capturing 2D images along with depth information for respective features included in the 2D images. Using the mobile device camera, a user can walk around a room and capture various images of the room while holding the camera at different positions and orientations relative to the room and the objects in the room. For example, the user can walk around the perimeter of the room and capture different perspectives of the room from different points along the perimeter. The user could also walk around the room and take close up views and different perspectives of objects included in the room (e.g., furniture).

Figure 2:
FIG. 2 presents an example 3D model of an environment generated using two-dimensional and three-dimensional image data of the environment captured by a mobile device camera in accordance with various aspects and embodiments described herein.
Figure 3:
FIG. 3 presents another example 3D model of an environment generated using two-dimensional and three-dimensional image data of the environment captured by a mobile device camera and including trace lines depicting movement of the mobile device camera through the environment during the capture process in accordance with various aspects and embodiments described herein.

For example, FIG. 2 presents an example 3D model 200 of an environment generated using 2D and 3D image data of the environment captured by a mobile device camera in accordance with various aspects and embodiments described herein. FIG. 3 presents another example 3D model 300 of the environment generated using 2D and 3D image data of the environment captured by a mobile device camera and including trace lines 302 depicting movement of the mobile device camera through the environment during the capture process. The trace lines 302 correspond to the path of the mobile device camera as it was moved (e.g., by a user) around the real world environment depicted in the 3D model 300. At various and/or continuous points along the path identified via the trace lines 302, the mobile device camera captured 2D and/or 3D image data of the environment. For example, in some implementations, the tick marks 304 on the trace lines 302 indicate points at which 2D and/or 3D image data was captured. As can be seen by the trace lines 302 and the tick marks, the positions of the mobile device camera over the course of the mobile scan of the environment are non-uniform and highly varied.

With reference back to FIG. 1, with respect to 102, the system facilitates navigating and viewing the 3D (e.g., 3D model 200 and the like) as displayed via an interface from different perspectives of a virtual camera relative to the 3D model. For example, the system can present a user with interface including 3D model 200 and allow the user to essentially walk through and/or orbit around the room to view the room from different perspectives and/or to view specific objects in the room (e.g., a chair, the couch, etc.) from different perspectives of a virtual camera. These different perspectives can include an original capture perspective corresponding to a 2D image of the room captured by the mobile device during the scan as well as completely new perspectives not directly captured by the mobile device during the scan. For example, at 104, the system can provide a representation of the 3D model from a first perspective of the virtual camera relative to the 3D model. At 106, the system can receive input requesting movement of the virtual camera relative to the 3D model. For example, the user can provide gesture input directing the virtual camera to move left, move right, move up, move down, zoom in, zoom out, pan or orbit/rotate horizontally around a vertical axis at a specific anchor point, pan or orbit/rotate vertically around a horizontal axis at a specific anchor point, etc.

At 108, the system can select a first 2D image of the 2D images based on association of a capture position and capture orientation of the first 2D image with a second perspective of the virtual camera relative to the 3D model determined based on the movement. For example, based on input requesting movement of the virtual camera in a particular direction or rotation, the system can determine a desired and/or appropriate second perspective of the virtual camera relative to the 3D model. In some implementations, the second perspective can be determined based on availability of a 2D image having a capture position and orientation associated with a second perspective of the 3D model indicated by the requested movement. According to these implementations, based on the requested movement, the system can be configured to determine a second perspective that corresponds to a capture position and orientation of an available 2D image of the environment and select that 2D image. In other implementations, the system can be configured to determine a second perspective that is near a capture position and orientation of an available 2D image of the environment and select that 2D image. For example, the system can determine a second position and orientation for the virtual camera relative to the 3D model corresponding to the second perspective based on a direction and/or rotation of the movement. The system can further select a 2D image having a capture position and orientation that is closest to the second position and orientation. Still in other implementations, the system can be configured to determine a second perspective that is not associated with a capture position and orientation of an available 2D image of the environment. According to these implementations, rather than selecting a 2D image for rendering, the system can generate a novel 3D representation of the 3D model using captured 3D data or a combination of captured 2D and 3D image data.

Further, at 110, the system can render the selected first 2D image via the interface. The rendered first 2D image is one type of representation of the 3D model. Other representations can include 3D representations of the 3D model generated based on 3D data or a combination of 3D data and 2D image data. For example, in some embodiments, the system can project some or all of the selected 2D image onto a 3D mesh to generate a novel representation of the 3D model, as described in greater detail infra.

Figure 4:
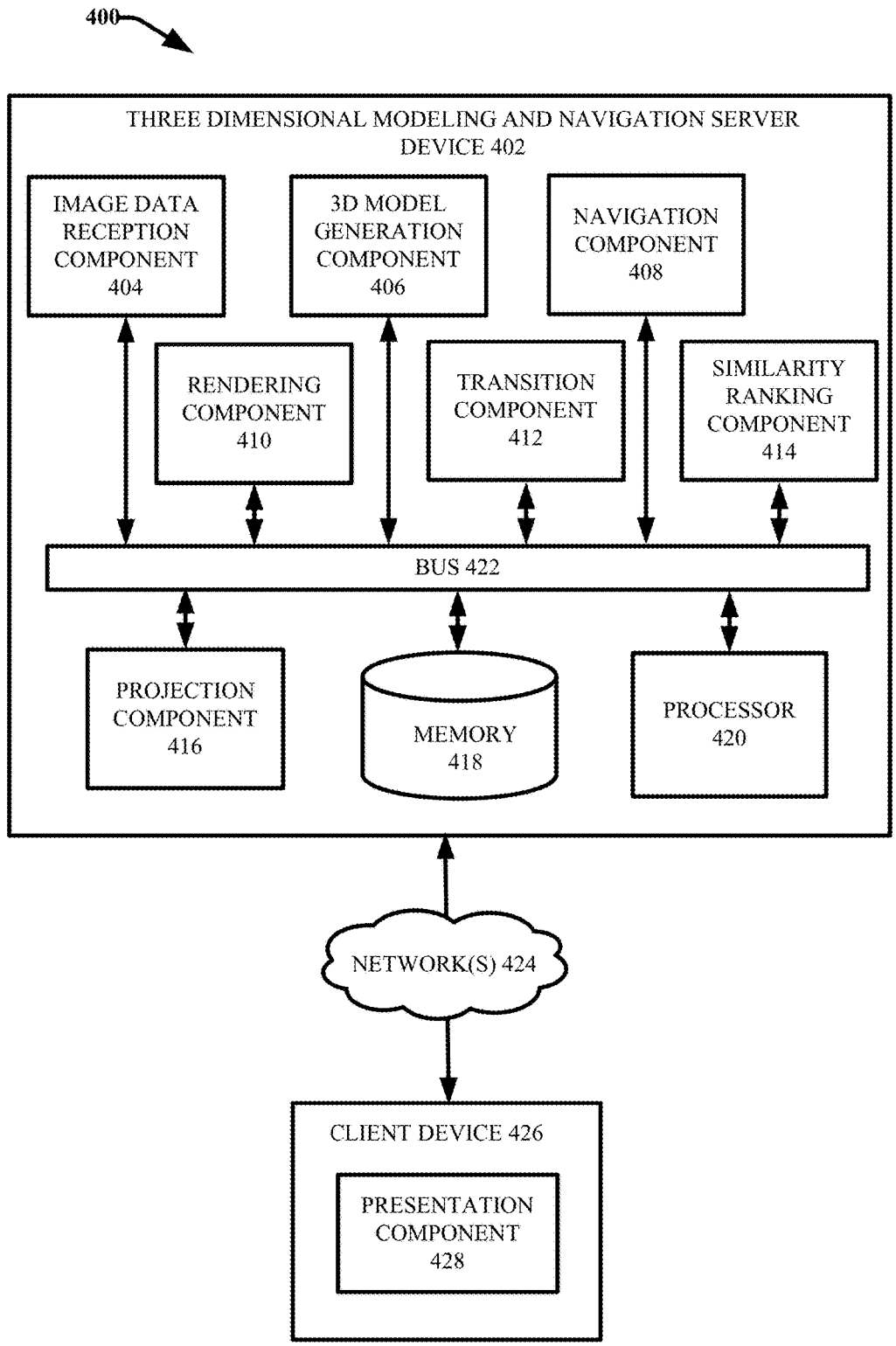
FIG. 4 illustrates an example system that facilitates generating, rendering and navigating a three-dimensional model of an object or environment in accordance with various aspects and embodiments described herein.

FIG. 4 illustrates an example system 400 that facilitates generating, rendering and navigating a 3D model of an object or environment in accordance with various aspects and embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

System 400 includes a 3D modeling and navigation server device 402 configured to facilitate generating, rendering, and navigating a 3D model of an environment. In various embodiments, the 3D modeling and navigation server device 402 can include image data reception component 404, 3D model generation component 406, navigation component 408, rendering component 410, transition component 412, similarity ranking component 414, and projection component 416. The 3D modeling and navigation server device 402 can also include or otherwise be associated with at least one memory 418 that stores computer-executable components (e.g., the image data reception component 404, 3D model generation component 406, navigation component 408, rendering component 410, transition component 412, similarity ranking component 414, and projection component 416). The 3D modeling and navigation server device 402 can also include or otherwise be associated with at least one processor 420 that executes the computer-executable components stored in the memory 418. The 3D modeling and navigation server device 402 can further include a system bus 422 that can couple the various components including, but not limited to, the image data reception component 404, the 3D model generation component 406, the navigation component 408, the rendering component 410, the transition component 412, the similarity ranking component 414, the projection component 416, the memory 418 and/or processor 420.

System 400 can also include a client device 426. In accordance with an embodiment, the 3D modeling and navigation server device 402 and the client device 426 are configured to operate in client/server relationship wherein the 3D modeling and navigation server device 402 provides the client device 426 access to 3D modeling and navigation services via one or more networks 424 using a network accessible platform (e.g., a website, a thin client application, etc.). However, system 400 in not limited to this architectural configuration. For example, in some embodiments, one or more components of the 3D modeling and navigation server device 402 can be provided on the client device 426. For example, in one implementation, the client device 426 can include the image data reception component 404 and the 3D model generation component 406 and the 3D modeling and navigation server device 402 can include the navigation component 408, the rendering component 410, the transition component 412, the similarity ranking component 414, and the projection component 416. In another implementation, all components depicted in system 400 can be included on single device. Further, the 3D modeling and navigation server device 402 can include any suitable device and is not limited to a device that operates as a "server" in a server/client relationship.

In one or more embodiments, the various components of system 400 can be connected either directly or via one or more networks 424. Such network(s) can include wired and wireless networks, including but not limited to, a cellular network, a wide area network (WAN, e.g., the Internet), a local area network (LAN), or a personal area network (PAN). For example, client device 426 can communicate with 3D modeling and navigation server device 402 (and vice versa) using virtually any desired wired or wireless technology, including, for example, cellular, WAN, wireless fidelity (Wi-Fi), Wi-Max, WLAN, and etc. In an aspect, one or more components of system 400 are configured to interact via disparate networks.

Client device 426 can include any suitable computing device associated with a user and configured to receive user navigational input and display a user interface including a 3D model and/or 2D image data. For example, a client device 426 can include a desktop computer, a laptop computer, a television, an Internet enabled television, a mobile phone, a smartphone, a tablet personal computer (PC), a personal digital assistant PDA, or a wearable computing device. Client device 426 can include a presentation component 428 to generate and present graphical user interfaces including the 3D models and representations or visualization of the 3D models (e.g., which can include 2D images and combined 2D and 3D data) described herein and that facilitate navigating and viewing various different perspectives of the 3D models in accordance with aspects and embodiments described herein. In some aspects, client device 426 can also include a three dimensional capture device that captures the 3D/2D data employed by the 3D modeling and navigation server device 402 to generate and render 3D and 2D visualizations of a real world object or environment in accordance with aspects and embodiments described herein. As used in this disclosure, the terms "content consumer" or "user" refer to a person, entity, system, or combination thereof that employs system 400 (or additional systems described in this disclosure) using a client device 426.

In one or more embodiments, the image data reception component 404 can be configured to receive sets of 3D data captured from a real world object or environment by a 3D capture device, and more particularly, a mobile 3D capture device (e.g., a camera included in a smartphone, tablet PC, wearable PC, etc.). Each set of the captured 3D data has a 2D image associated with it that has a determined position and orientation relative to a 3D coordinate space. For example, a set of 3D data can include information about the position and appearance of objects in a physical space, including the various objects or features of the internal space of a room or the structure of an object in the room. The position of the 3D data in each set can be mapped to the 3D coordinate space. The 3D data can also include information regarding the position and/or orientation of the capture device relative to the 3D coordinate space when the 3D data for each set was captured. The 3D can include one or both of geometry and appearance information from points and/or regions of the real world object or environment. In an aspect, the sets of 3D data respectively include points corresponding to image pixels, wherein the respective points are associated with position information indicating their position relative to the 3D coordinate space.

Examples of 3D capture devices include but are not limited to: LIDARs, hand-held laser line scanners, structured light projectors paired with cameras such as the Microsoft® Kinect, other structured light systems, stereo cameras with software for depth derivation, stereo cameras paired with pattern projection systems as well as software for depth derivation, time-of-flight cameras, video cameras capable of structure-from-motion calculations, and lightfield cameras. Multiple capture devices may be combined or a capture device may be paired with a color camera to provide color detail for the captured 3D information.

The 3D model generation component 406 can be configured to employ the sets of 3D data and the 2D image data to generate a 3D model of the real world object or environment. For example, the 3D model generation component 406 can employ an alignment process to generate the 3D model. In an aspect, the alignment process includes aligning the captured sets of 3D data and/or respective points included in the sets of 3D data relative to one another and the 3D coordinate space. The 3D model generation component 406 can also employ the sets of 3D data to generate various representations or visualizations of the 3D model from different perspectives or views of a virtual camera position outside or within the 3D model. In an aspect, as described infra, these representations can include one or more of the captured 2D images and/or image data from one or more of the 2D images.

The 3D model(s) generated by 3D model generation component 406 generally include one or more meshes of triangles, quads, and/or n-gons. The terms 3D model, 3D representation of an object or environment, and mesh are used herein interchangeably. The 3D model(s) can also include curved surfaces such NURBS, which are a function of two parameters mapped to a common surface area in three-dimensional space. The 3D model(s) can also include point clouds or surfel clouds. In some aspects, the 3D model(s) can have associated color or material properties. For example, each vertex of a mesh can contain associated texture data in one or more separate images via UV mapping. Examples of common 3D model formats include ".obj", ".fbx", and ".dae."

The 3D model(s) can also have associated metadata, some of which may be tied to specific sets of coordinates. For example, this metadata can contain a name for a model, information about when, where, by whom, and with what hardware, the model was captured. The metadata can also contain annotations tied to specific locations, areas, or volumes on or around the model, as well as measurements of dimensions on or around the model. For example, in addition to the original camera information and imagery captured by a 3D camera/capture device while a user is employing the camera to capture a particular location, it is also possible to capture contextual information pertaining to that view or location such as audio or voice annotations spoken by the user. Other types of annotations could include additional image captures, for example a 2D panorama from a location or additional photographs and/or video of an object or place of interest. These may be acquired during or separate from the 3D capture process. These contextual annotations that are location-specific within the captured 3D space can be played back later while viewing the model as the user navigates to the appropriate matching locations, as described below.

In some embodiments, the capture process can be paused at any point and resumed from another angle or position looking at the object or space from a different perspective and location. This allows for refining of the captured data or allowing the user to avoid certain obstacles or objects of non-interest, or to manage external system interruptions such as system notifications.

In one or more embodiments, the alignment process can involve determining position and visual feature data for respective points in received 3D data sets associated with known camera capture positions and orientations relative to a 3D coordinate space. The 3D data sets, feature data, associated 2D images, and other sensor data (if available) can then be used as inputs to an algorithm that determines potential alignments between the different 3D data sets via coordinate transformations. These potential alignments are evaluated for their quality and, once an alignment of sufficiently high relative or absolute quality is achieved, the 3D data sets may be aligned together. Through repeated alignments of new 3D data sets (as well as potential improvements to alignments of existing 3D data sets), a global alignment of all or most of the input 3D data sets into a single coordinate frame may be achieved. The alignment process can also employ 2D data to facilitate aligning two or more 3D data sets. Additional details regarding the alignment process are further provided in U.S. Pat. No. 8,879,828 filed on Jun. 29, 2012, and entitled "CAPTURING AND ALIGNING MULTIPLE 3-DIMENSIONAL SCENES," and U.S. Pat. No. 9,324,190 filed on Feb. 23, 2013 and entitled "CAPTURING AND ALIGNING MULTIPLE 3-DIMENSIONAL SCENES," then entireties of which are incorporated herein by reference.

The navigation component 408 can be configured to facilitate navigation of a 3D model generated by 3D model generation component 406. In particular, in accordance with various embodiments, a 3D model can be viewed and rendered from various perspectives of a virtual camera relative to the 3D model in association with navigation of the 3D model. Different views or perspectives of a 3D model are referred to herein as representations, visualizations or renderings of the 3D model. These terms are used interchangeable throughout the subject description. In some embodiments, different views or perspectives of the 3D model can be generated based on interaction with the 3D model in one or more modes such, a walking mode, a dollhouse/orbit mode, a floor plan mode, a feature view mode, and the like. In particular, navigation component 408 can allow a user to view the 3D model from various perspectives of a virtual camera positioned within or outside of the 3D model. For example, navigation component 408 can allow a user to interact with the 3D model in a manner that simulates walking about the 3D space, orbiting around the 3D, and viewing the 3D space from different distances (e.g., levels of zoom in or zoom out). The different views or perspectives of the 3D space are then rendered via an interactive graphical interface by rendering component 410 (and presented/displayed at the client device 426 via presentation component 428).

In various embodiments, walking mode can refer to a mode for navigating and viewing a 3D model from viewpoints within the 3D model. The viewpoints can be based on a camera position, a point within a 3D model, a camera orientation, and the like. In an aspect, the walking mode can provide views of a 3D model that simulate a user walking through or otherwise traveling through the 3D model (e.g., a real-world scene). The user can rotate and move freely to view the scene from different angles, vantage points, heights, or perspectives. For example, the walking mode can provide perspectives of a 3D model from a virtual camera that corresponds to the eyes of a virtual user as the virtual user walks around the space of the 3D model (e.g., at a defined distance relative to a floor surface of the 3D model). In an aspect, during walking mode, the user may be constrained to have a camera viewpoint at a particular height above the model surface except when crouching or in the air (e.g., jumping, falling off an edge etc). In an aspect, collision checking or a navigation mesh can be applied such that users are restricted from passing through objects.

The dollhouse/orbit mode represents a mode wherein a user perceives the model such that the user is outside or above the model and can freely rotate a model about a central point as well as move the central point around the model. For example, the dollhouse/orbit mode can provide perspectives of a 3D model wherein a virtual camera is configured to view an internal environment from a position removed from the internal environment in a manner that resembles looking into a dollhouse (e.g., with one or more walls removed) at various pitches relative to a floor of the model. Multiple types of motion may be possible in dollhouse/orbit mode. For example, a viewpoint may be pitched up or down, rotated left or right around a vertical axis, zoomed in or out, or moved horizontally. The pitch, rotation-around-a-vertical-axis, and zoom motions may be relative to a central point, such as defined by an (X, Y, Z) coordinate. A vertical axis of rotation may pass through the central point. In the case of pitch and rotation-around-a-vertical-axis, those motions may maintain a constant distance to the central point. Thus, the pitch and rotation around-a-vertical-axis motions of the viewpoint may be thought of as vertical and horizontal travel, respectively, on the surface of a sphere centered on the central point. Zoom may be thought of as travel along the ray defined as passing through the viewpoint to the central point. The point on the 3D model with or without back-face culling or other ceiling removal techniques that is rendered in the center of the display may be used as the central point. Alternately, this central point may be defined by the point of a horizontal plane that is at the center of the display. This horizontal plane may be invisible, and its height may be defined by a global height of the floor of the 3D model. Alternately, a local floor height may be determined, and the intersection of the ray cast from the camera to the center of the display with the surface of the local floor height may be used to determine the central point.

The floor plan mode can present a view of a 3D model that is orthogonal or substantially orthogonal to a floor of the 3D model (e.g., looking down at the model from directly above). The floor plan mode can represent a mode wherein the user perceives the model such that the user is outside or above the model. For example, a user can view all or a portion of a 3D model from an aerial vantage point. The 3D model can be moved or rotated about an axis. As an example, floor plan mode can correspond to a top down view, wherein the model is rendered such that a user looks directly down onto a model or at a fixed angle down onto the model (e.g., approximately ninety degrees above a floor or bottom plane of a model). In an as representation of the 3D model generate in floor plan mode can appear 2D or substantially 2D. The set of motion or navigation controls and mappings in floor plan mode may be a subset of those for dollhouse/orbit mode or total available controls of other models. For example, the controls for floor plan mode may be identical to those described in the context of orbital mode with the exception that the pitch at a fix number of degrees downward. Rotation about a central point along a vertical axis is still possible as is zooming in and out toward and away from that point and moving the central point. The model may, however, only be viewed directly from above as a result of the fixing a pitch.

The feature view mode can provide perspectives of the 3D model from a shorter distance than the dollhouse/orbit view context (e.g., a close up view of a particular item or object of the 3D model). In particular, the feature view allows a user to navigate within and around the details of a scene. For example, with the feature view, a user can view different perspectives of a single object or area included in the internal environment represented by a 3D model. In various embodiments, selection of a tag icon included in a 3D model or representation of the 3D model can result in generation of a feature view of the point, area or object associated with the tag icon.

Figure 5:
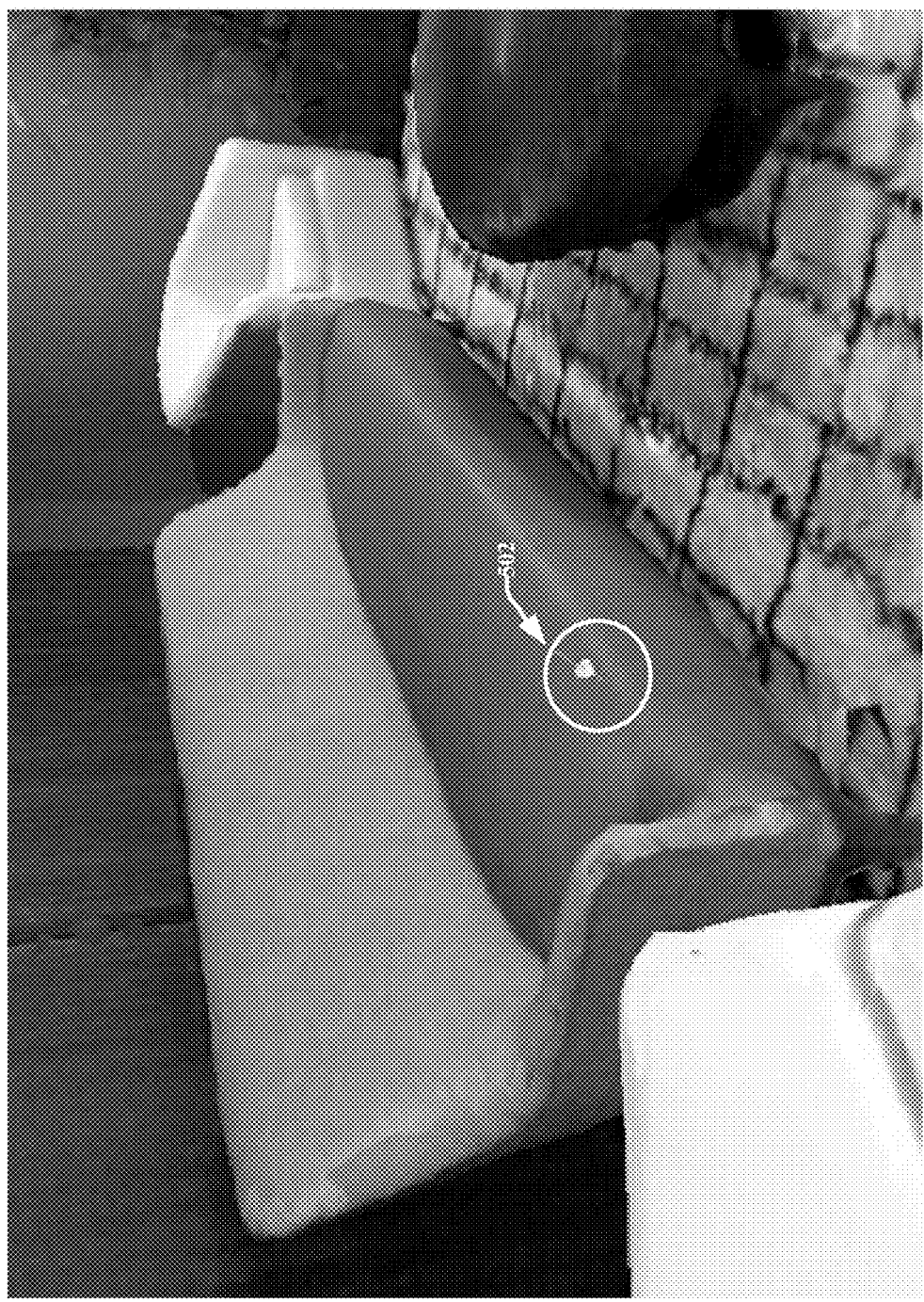
FIG. 5 presents an example feature view visualization of a 3D model of an environment generated using two-dimensional and three-dimensional image data of the environment in accordance with various aspects and embodiments described herein.

For example, FIG. 5 presents an example feature view visualization 500 of a 3D model of an environment generated using two-dimensional and three-dimensional image data captured of the environment in accordance with various aspects and embodiments described herein. In the embodiment shown, the feature view provides a close up view of a portion of the 3D model 200 shown in FIG. 2. In an aspect, the 3D model 200 depicted in FIG. 2 illustrates a dollhouse viewing mode of the 3D model 200. In the embodiment shown, a 3D cursor 502 is located on a portion of the visualization. The shape of the 3D cursor can conform to the 3D surface geometry of the surface of an object included in the visualization 500 over which the cursor is placed. For example, in visualization 500, the 3D cursor 502 has the form of a 3D disk that conforms to the surface curvature of the edge of the couch. The 3D cursor 502 can also include an arrow expressing surface orientations that reveal the 3D scene geometry. Alternately a 2D cursor may be used.

Returning back to FIG. 4, in association with facilitating navigation of a 3D model, the rendering component 410 and/or 3D model generation component 406 retain the original captured camera information, positions, orientations, and imagery to provide high-quality imagery of specific areas of the model as the user navigates about it. In an exemplary embodiment, the high-quality imagery can include views of original 2D images from capture perspectives of the original captures. In addition, the high-quality imagery can include reconstructed 3D meshes of the model from different perspectives, and/or mixed 3D and 2D image data. These different perspectives can be based on the feature view modality and/or the dollhouse view modality discussed above. The various views of the 3D model are further smoothly blended when transitioning between them by transition component 412.

The navigation component 408 can provide a mechanism for navigating between these different views or perspectives of a 3D model based on user input that is interpreted by the navigation component 408 as a request to move the virtual camera relative to the 3D model. This input for example can include a signal that indicates a direction and or manner of movement of the virtual camera in either a virtual 3D space or screen-relative 2D coordinates (e.g., relative to the 2D display screen including the 3D model or representation of the 3D model). For example, in association with display of a 3D model or representation of the 3D model from particular perspective (e.g., position and orientation) of a virtual camera, the navigation component 408 can receive 2D gesture and 3D gesture input. 2D gestures are those relative to the viewer's position and view direction. They include "move right," "move left, "move up," or "move down," and require context for meaning. 3D input can include or indicate a request to zoom in or zoom out. 2D or 3D input can also include or indicate a request to pan or rotate the virtual camera around a vertical axis (e.g., relative to a horizontal surface of the 3D model) at a defined point (e.g., referred to herein as an "anchor point"), or pan or rotate the virtual camera around a horizontal axis at a defined anchor point.

In addition, in various embodiments, 3D input can include selection of a point on the 3D model or representation of the 3D model. In various implementations, the selected point on the 3D model or representation of the 3D model can include a point that the viewer desires to move the virtual camera to, referred to herein as a "perspective point." According to these implementations, the navigation component 408 can be configured to move the virtual camera to the location of the perspective point. In other implementations, the selected point on the 3D model or representation of the 3D model can include a point that viewer desires to look at more closely, referred to herein as a "look here" point or "target" point. According to these implementations, the navigation component 408 can be configured to interpret selection of a target point on the 3D model as a desire to move the virtual camera to closer perspective of the target point or object associated with the target point.

In some implementations, a selected perspective point or target point can be interpreted by the navigation component 408 as a request to designate the selected perspective point or target point as a designated reference point for which to base subsequent representation of the 3D model on, regardless of the type of input received, until a new perspective point or target point is selected. This reference point is referred to herein as an "anchor point." The navigation component 408 can also receive user input that specifically designates a selected target point (via special keys or long-press) as an anchor point. In an aspect, the anchor point can be indicated in the graphical interface by a special user interface (UI) element, and has persistent effect over the navigation component's interpretation of subsequent 2D gestures. For example, after the navigation component 408 receives input identifying or indicating a perspective point or a target point, the rendering component 410 can render a representation of the 3D model at a new determined position (e.g., determined by the navigation component 408) corresponding to the perspective point or at a determined new position (e.g., determined by the navigation component 408) relative to the target point.

In one or more embodiments, the navigation component 408 has assigned an anchor point in the 3D scene based on received user input, the navigation component 408 can orbit the virtual camera around that location in the appropriate direction indicated by the gesture. In all other cases, the navigation component 408 will choose an appropriate motion type for the virtual camera based on context. For example, if the navigation component 408 detects that the virtual camera is inside the scene, it will pan (turn) in the requested direction. If instead there appears to be an object of immediate interest nearby, the navigation component 408 will orbit the virtual camera around it. If neither case can be determined, the navigation component 408 can simply move the virtual camera in the indicated direction on a 2D plane (e.g., up, down, left, or right).

The manner in which the input is correlated to a defined movement of the virtual camera can vary (e.g., depending on the input components of the client device 426 at which the 3D model is being displayed). For example, in some implementations, the input can be responsive to selection of a hard or soft button corresponding to the desired movement (e.g., an up button, a down, button, a left button, a right button, a zoom in button, a zoom out button, a pan left button, a pan right button, etc.). In another example, the input can be responsive to a gesture made on or over a touch screen display. In another example, the input can be responsive to a defined body or hand motion (e.g., gesture input).

In an aspect, the navigation component 408 can present these relative 2D and/or 3D movement directions as on-screen buttons and/or permit the use of physical keys and gestures according to the capabilities of the viewing user's device. In an aspect, when a user triggers a 2D motion (e.g., via keypress input, selection of an on-screen button, double-finger touchscreen tap input, etc.), the navigation component 408 will choose from a hierarchy of possible motion types, dynamically chosen based upon the current location and orientation of the virtual camera, any previously-selected anchor point, and the context of the current visualization (e.g., dollhouse vs. feature view). This method accounts for two primary modalities of user exploration: either dollhouse view context (e.g., views looking into a location such as a room, generally from outside or above), or feature view (e.g., views around a specific object of interest, such as an item of furniture or sculpture). The navigation component 408 can automatically disambiguate the meaning of a user gesture by incorporating information from the 3D scene where the gesture options are limited. Finally, the feature view, like the dollhouse view, allows the virtual camera to be arbitrarily orbited and navigated around the scene via mouse or finger dragging (or head motion, in the case of VR headsets), and forward/back motions are supported by scroll wheel, middle mouse, pinch, or other gestures appropriate to the display device.

In an aspect, the navigation component 408 can receive user input that directs the view of a virtual camera relative to a generated and presented 3D model and/or 3D coordinate space to a specific location in the scene by the use of a 3D surface-contour-following cursor. The navigation component 408 can also receive user input indicating a view-relative motion to the left or right in 2D as discrete steps, using physical or on-screen buttons and gestures. The navigation component 408 can further distinguish between user input indicative of a 2D gesture or a 3D gesture, wherein a 2D gesture corresponds to a directed movement of the virtual camera relative to a 2D plane and 3D gesture corresponds to a directed movement of the virtual camera relative to a 3D space.

Figure 6:
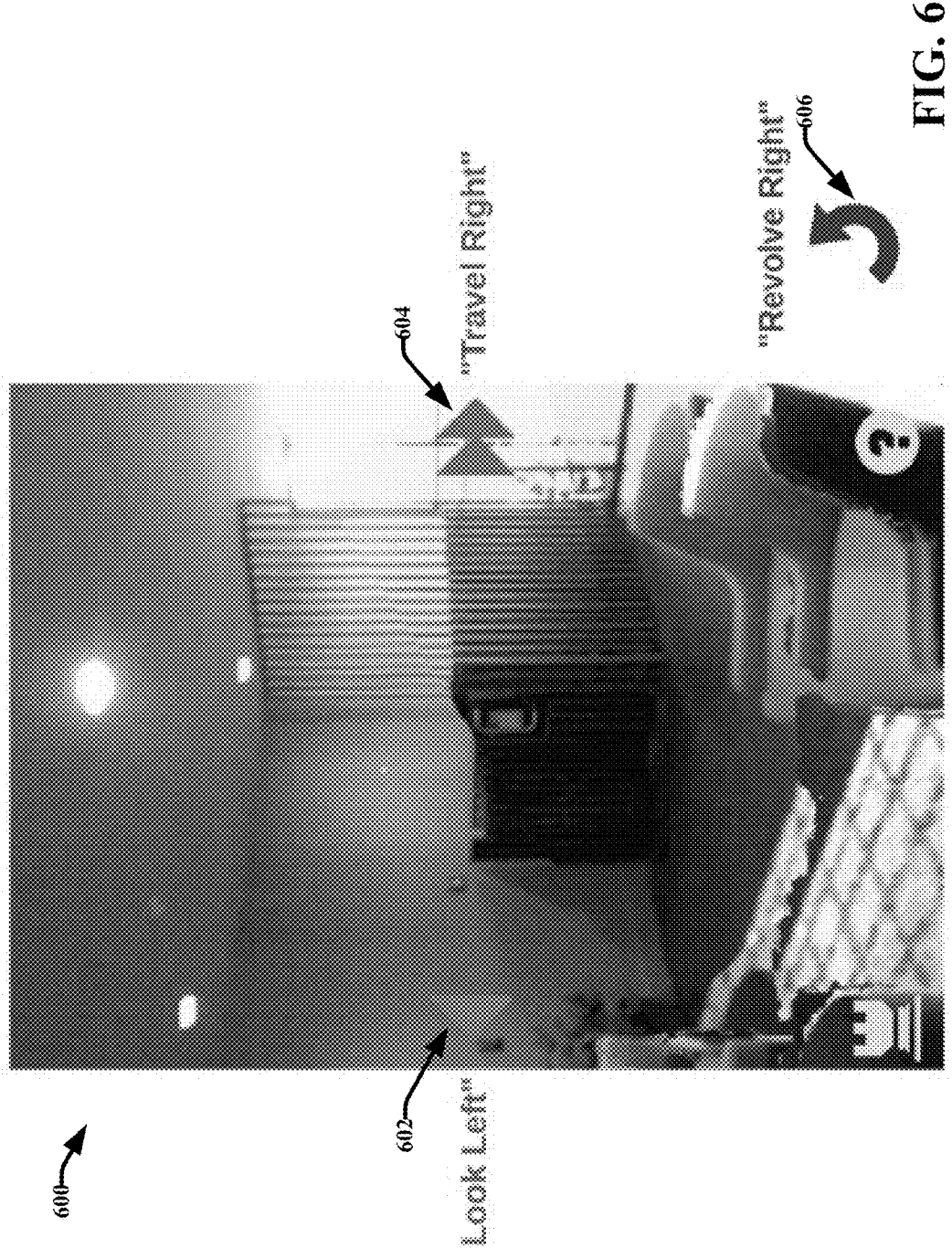
FIG. 6 presents an example graphical user interface that facilitates viewing and navigating a 3D model in accordance with various aspects and embodiments described herein.

FIG. 6 presents an example graphical user interface 600 that facilitates viewing and navigating a 3D model in accordance with various aspects and embodiments described herein. Interface 600 includes some example on-screen soft buttons that provide for input of navigational gesture commands, including a "look left" arrow 602, a "travel right" arrow 604, and a "revolve right" arrow 606. In an example embodiment, selection of the look left arrow 602 can provide the navigation component 408 with command to rotate the virtual camera in a defined amount to the left from the current orientation of the virtual camera. Selection of the travel right arrow 604 can provide the navigation component 408 with command to move the virtual camera in a defined amount to the right the current position of the virtual camera. Also according to the example embodiment, selection of the "revolve right" arrow 606 can provide the navigation component 408 with a command to pan or orbit right relative to an anchor point and/or the current position of the virtual camera. Additional look, revolve, and travel icons may be available for other directions as well, and may be disabled if such movement is not possible.

In one or more embodiments, available relative-navigation choices included in the graphical user interface 600 and the like are determined by the system 400 and on-screen icons are updated accordingly. For left- and right- motions (which may be triggered by the on-screen buttons, or on desktop device by using the arrow keys), different icons and colors can be used to inform the user about the current state of the system. For example, in interface 600, there may be no useful mesh or image data to the right of the current view, so a "travel right" icon is shown as opposed to a "look right" arrow 604. To the left, useful mesh data however may exist, and so the "look left" arrow 602 can be provided or provided in a specific activated state (e.g., as indicated by a color of the arrow) to indicates what will occur if that option is chosen. In some implementations, if the scene is associated with a defined anchor point (or there is no geometry on either side—only in front of the camera), then left or right motions will revolve around the selected geometry, and the navigation buttons will appear as circular arrows, such as the "revolve right" arrow 606. In some implementations, the color of the "revolve right" arrow can change depending on whether this navigation command is available and appropriate. For example, the color can be displayed either in blue when an anchor point is defined or in black when only isolated geometry is present.

With reference back to FIG. 4, in various embodiments, based on received input indicating or requesting a desired movement of the virtual camera relative to a 3D model or representation of the 3D model from a first perspective of the 3D model, the navigation component 408 can determine a desired second perspective of the 3D model. The navigation component 408 can further select one or more 2D images associated with the desired perspective of the 3D model for rendering and/or for projecting onto a 3D mesh of the 3D model.

For example, the 3D model generation component 406 can generate, (and rendering component 410 can render), a representation of a 3D model of an environment from a first perspective of a virtual camera relative to the 3D model. The representation of the 3D model can be a 2D image of the 3D model, a 3D reconstruction of the 3D model including 3D data, or a 3D reconstruction of the 3D model including a combination of 2D and 3D data. The navigation component 408 can then receive user input indicating movement of the virtual camera from the first perspective to a second perspective. For example, the user can provide input selecting a specific location or region of the representation the user would like to view or provide input indicating the user would like to move the virtual cameral left, right, up, down, etc., or rotate left, right, up, down.

In one embodiment, based in part on reception of input requesting movement of the virtual camera relative to a first perspective of the 3D model, the navigation component 408 can determine a second position and orientation for movement of the virtual camera to relative to the 3D model. In particular, the navigation component 408 can interpret the user input and determine where and how (e.g., position and orientation) to move the virtual camera away from the first perspective to the new perspective of the 3D model. Accordingly, users can trigger movement in the coordinate space for a 3D model of a particular type, and the navigation component 408 can determine the best second position and orientation to move the virtual camera based on the desired type of movement.

After the navigation component 408 has determined a second position and orientation of the virtual camera at the new perspective based on the user input, the navigation component 408 can examine the plurality of original 2D images captured of the real world environment for which the 3D model is based and identify one or more of the 2D images of the environment associated with the second position and orientation. The rendering component 410 can further be configured to render the one or more 2D images. In an aspect, when the second position and orientation for the virtual camera at the second perspective relative to the 3D coordinate space matches or substantially matches a capture position and orientation of a 2D image, the rendering component 410 can render the 2D image as opposed to or in addition to rendering a 3D representation of the model at the second perspective. In other aspects, the rendering component 410 can incorporate image data from the 2D image (and image data from other 2D images associated with similar positions and orientations) with a new 3D representation of the model at the second perspective (e.g., to fill holes, to fill occluded regions, to add color and depth to the new 3D representation, etc.).

In various additional embodiments, the desired position and orientation of the virtual camera is based on availability, similarity and/or closeness of an original 2D image corresponding to an indicated direction or location/orientation for the virtual camera. For example, in another implementations, the navigation component 408 can be configured to move the virtual camera along a 2D or 3D trajectory path based on the current position and orientation of the virtual camera, the movement input, and in some implementations an anchor point, until the navigation component 408 has moved the virtual camera to a position and orientation corresponding to a capture position and orientation of a 2D image captured of the environment. The navigation component 408 can then select that 2D image for rendering.

Still in other embodiments, the navigation component 408 can be configured to determine a 3D trajectory path (e.g., relative to the 3D model) from the current position and orientation of the virtual camera and in the direction indicated by the movement input. The navigation component 408 can then determine whether the trajectory path intersects with a part of the 3D model/mesh. Based on a determination that the trajectory path intersects with a part of the 3D model/mesh, the navigation component 408 can be configured to identify and select one or more of the 2D images captured of the environment that provides the "best" view of the intersected part. The rendering component 410 can then render the selected one or more of these 2D images. In other implementations, based on a determination that the trajectory path does not intersect with a part of the 3D model/mesh, the navigation component 408 can be configured to identify and select one or more of the 2D images captured of the environment that are associated with a position and orientation of the trajectory path. The rendering component 410 can then render the selected one or more of these 2D images.

Figure 7:
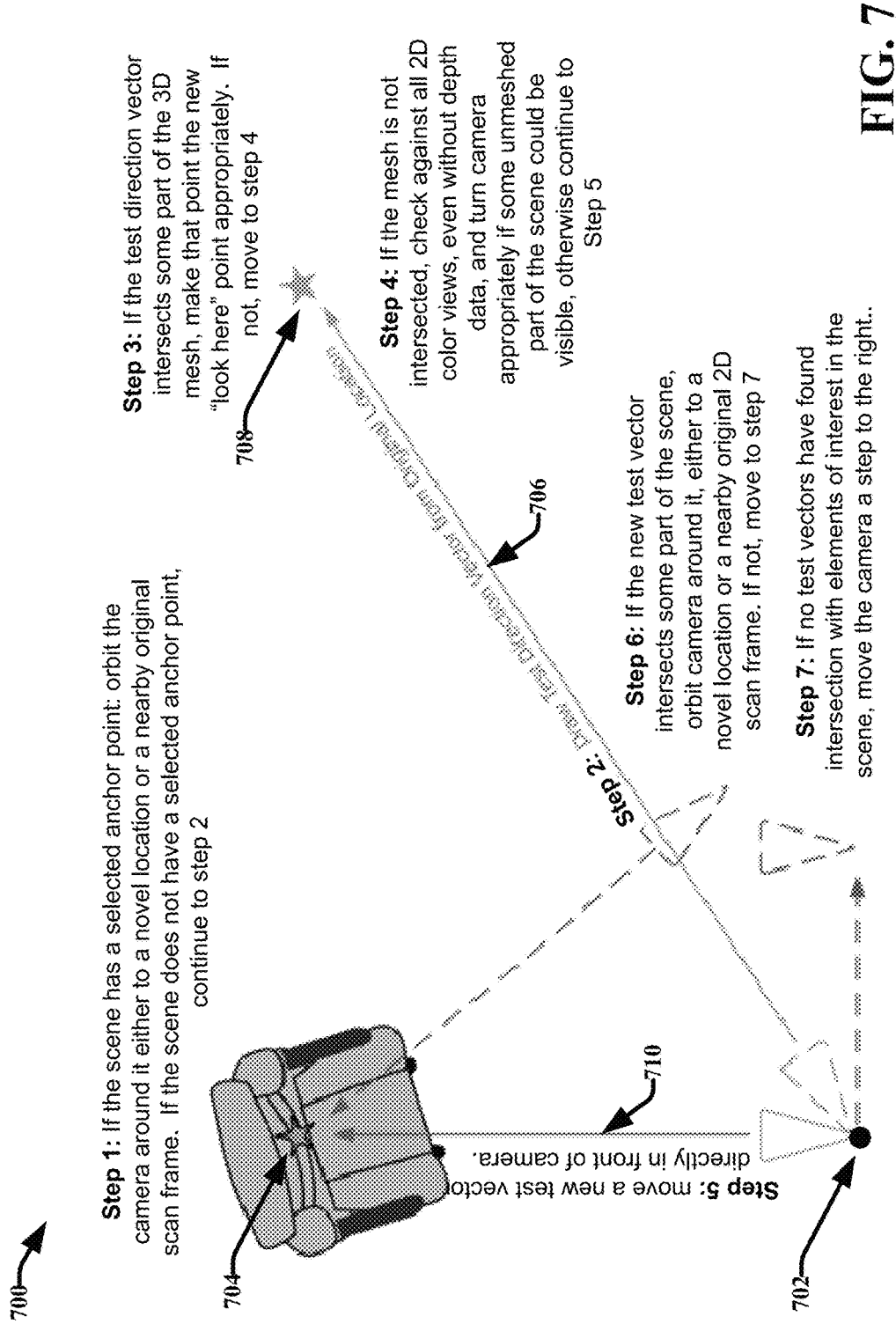
FIG. 7 presents a diagram of a example process for determining a second position and orientation of a virtual camera relative to a three-dimensional model of an environment based on user input indicating movement of the virtual camera away from a first position and orientation relative to the three-dimensional model in accordance with various aspects and embodiments described herein.

FIG. 7 presents a flow diagram 700 for determining a second position and orientation of a virtual camera relative to a three-dimensional model of an environment based on user input indicating movement of the virtual camera away from a first position and orientation relative to the three-dimensional model in accordance with various aspects and embodiments described herein. In particular, flow diagram 700 shows the steps taken by the navigation component 408 to determine the best new camera location and/or orientation when the user indicates a "navigate to the right" gesture. Similar steps would be followed for navigation gestures along other 2D directions.

When a user indicates navigation in a particular direction, a virtual view camera will move appropriately based on whether the user is viewing inside a model or dollhouse view (e.g., a room), viewing around a model or feature view (e.g., a single piece of furniture), or disconnected from specific interactions with the model and merely moving through 3D space. The system also displays available options through on-screen indicators.

In flow diagram 700, point 702 marks the current perspective of the virtual camera relative to the chair. In response to reception of 2D user input that indicates a request to move the virtual camera in a 2D direction to the right of point 702, (e.g., a "navigate to the right" gesture), in one embodiment in which an anchor point has been established, at step 1, the navigation component 408 can be configured to orbit the virtual camera around the anchor point (e.g., in a 3D direction) either to a novel location relative to the 3D space or to a known location relative to the 3D space that is associated with an original scan frame. In various embodiments, an anchor point can have been established if the user had previously selected a perspective point or a target point (e.g., a "look here" point). The navigation component 408 can be configured to treat this previously and most recently selected perspective point or target point as the anchor point in step 1.

For example, assuming the user has previously and most recently selected the point on the chair corresponding to star 704 as a target point (e.g., a "look here" point), the navigation component 408 can be configured to treat the star 704 as the current anchor point and move the virtual camera from current point 702 relative to the star 704. In particular, based on input indicating a request to "move to the right," the navigation component 408 can rotate the virtual camera in a counterclockwise circular direction in the 3D space relative to star 704 (e.g., as if a vertical axis was extending through the star) while maintaining the same orientation of the virtual camera at the original perspective and the same distance between the virtual camera and the star 704 at the original perspective. Along this rotational path (e.g., which corresponds to an arc of a circle with star 704 being the center of the circle), in one implementation, the navigation component 408 can stop at a novel location (e.g., determined based on the received input) and find a 2D image associated with an original capture position and orientation that is closest to the novel position (and orientation) of the virtual camera. In another embodiment, the navigation component 408 can be configured to rotate along this rotational path and stop at position along the rotational path that is closest to with an original capture position and orientation of a 2D image of the chair. For example, the navigation component 408 can be configured to stop rotating counterclockwise along this navigational path the first time it reaches a position corresponding (or substantially corresponding relative to a threshold degree of correspondence) to an original capture position of a 2D image of the chair. The 2D image or images identified by the navigation in step 1 in accordance with the embodiments described above can then be rendered via the rendering component 4110.

However, in an embodiment in which an anchor point is not established, in response to reception of 2D user input that indicates a "navigate to the right" gesture, the navigation component 408 can begin process 700 at step 2. At step 2, the navigation component 408 can be configured to rotate or turn the virtual camera located at point 702 a defined amount to the right (e.g., 45°) and determine (or figuratively draw) a test vector 706 from the original perspective of the virtual camera at point 702 in this direction away from point 702 and the defined degree towards the right. In an aspect, the defined degree or amount of rotation can be fixed or based on the user input. For example, the degree to which the navigation component 408 rotates the virtual camera to the right can be based on press duration of a "move right" button, wherein the longer the press duration the greater degree of turn to the right. At step 3, if the test vector intersects with some part of the 3D model or mesh (e.g., identified by star 708) corresponding to a point on a physical object (e.g., not a point in space), the navigation component 408 can define the intersection point as the new target point and move the virtual camera appropriately. For example, the navigation component 408 can move the virtual camera to a position closer to the target point at with the target point being directly in front of the virtual camera. The navigation component 408 can then identify one or more 2D images associated with the new position and orientation of the virtual camera for rendering. In another example, the navigation component 408 can be configured to move the virtual camera to a position and orientation of a 2D image having a capture position and orientation associated with a "best" view of the target point. For example, the target point can be associated with a preselected 2D image that corresponds to a feature view of the target point. The navigation component 408 can thus move the virtual camera to a position and orientation associated with this preselected 2D image and the rendering component 410 can render this preselected 2D image.

However, if the test vector 706 does not intersect with any physical part of the 3D model or mesh, the navigation component 408 can proceed to step 4. At step 4, the navigation component 408 can be configured to examine the collection of 2D images associated with the 3D model to determine whether one or more of the 2D images is associated with a capture position at any point along the test vector 706 and with the orientation or view direction of the test vector 706. If one or the 2D images satisfies this criteria, the navigation component 408 can select this 2D image for rendering. In some implementation, if two or more of the 2D images satisfies this criteria, the rendering component 410 can employ a compilation of the two or more 2D images for rendering a novel view of the 3D model based on the compilation, or select one of the 2D images having a closest position to the target point if depth information is available (e.g., star 708).

If however at step 4 the mesh is not intersected and a 2D image associated with the direction of the test vector 706 is not available, the navigation component 408 can proceed to step 5. At step 5, the navigation component 408 can define a new test vector 710 that extends as a ray directly away from the current point 702 at the current orientation of the virtual camera at capture point 702, which in this case is towards the chair. If the new test vector 708 intersects with a point of the 3D model or mesh corresponding to a point on a physical object, the navigation component 408 can treat this intersection point as an anchor point, proceed to step 6 and move accordingly. For example, if the intersection point of vector 710 is star 704 (as depicted), the navigation component 408 can rotate the virtual camera relative to the star 704 in the same manner as described with respect to step 1. If however at step 5 the new test vector does not intersect with a part of the 3D model or mesh (e.g., assuming the chair in the embodiment shown is at a different location and no part of the 3D mesh intersects with vector 710), the navigation component 408 can be configured proceed to step 7 and simply move the virtual camera a defined step to the right.

Referring back to FIG. 4, with respect to 3D gestures, in some implementations, the navigation component 408 can receive user input that selects a specific target point on a 3D model/mesh, also referred to herein as a "look here point," (e.g., via click or touch, depending upon the input capabilities of their client device 426, called a "look here point"). For example, when viewing a 3D model or a representation of the 3D model from any perspective, the user can provide input selecting a point on the 3D model that the user would like to take a closer look at. Based on reception of user input indicating a target point, the navigation component 408 can be configured to try and find one or more 2D images having capture positions and orientations that provide a good view of target point location based on criteria from both the current position and orientation of the virtual camera and the target point itself.

For example, in some implementations the navigation component 408 can determine a 3D coordinate location of the selected target point relative to the 3D model and/or 3D coordinate space in which the 3D model is aligned. The navigation component 408 can further examine a set of 2D images captured of the environment and identify a subset (e.g., including one or more 2D images) of the 2D images that show the "best" view of the selected target point. For example, with reference to FIG. 2, when viewing 3D model 200, a user may provide input selecting a surface of the coffee table as a look here point. Based on such input, the navigation component 408 can determine a 3D coordinate position of the selected point on the coffee table and further examine a set of 2D images capture of the scene to isolate one or more of the 2D images that provide the "best" view of the selected point of the coffee table. In one or more embodiments 2D that provide a "best" view of a target point can be selected based on but not limited to: having a capture position and orientation that aims as directly as possible at the target point; having a capture position and orientation at a "reasonable" distance from the target point determined based on known characteristics of the capture device; having of a capture position and orientation with a same side of the target point as the current virtual camera position and orientation, and association of; and having a capture position and orientation aimed in roughly the same direction as the current direction as the virtual camera. In various embodiments, based on user input selecting a target point the navigation component 408 can be configured to determine information about the coordinate location of the look here point, such as visual features associated with the coordinate location and the reconstructed 3D model/mesh, as well as original capture positions of one or more 2D images and/or 3D data sets associated with capture of the coordinate location. The navigation component 408 can further employ this information to select one or more 2D images having a "best view" of a target point.

In various embodiments, the similarity ranking component 414 can be configured to rank potential 2D images based on the aforementioned criteria and the best candidate becomes the new navigation target. For example, the similarity ranking component 414 can further rank the 2D images according to a scoring function to determine which captured 2D image(s) provide the best view of the selected target point If no such scans are found, the virtual camera will adjust itself as needed to get a slightly-better view of the target point without a matching image. In some implementations, For the similarity ranking component 414 can rank the respective 2D images based on degree of similarity between their respective capture positions and orientations (relative to the 3D coordinate space) and relative to a determined coordinate position and orientation that provides the "best view" of the selected target point. This determined coordinate position and orientation can be determined based on one or more of the criteria noted above. The similarity ranking component 414 can further select one of the 2D images based on the ranking (e.g., wherein the 2D image having a highest degree of similarity in capture position and orientation relative to the determined capture position and orientation is selected). The rendering component 410 can then render the selected 2D image. In an aspect, the transition component 412 then smoothly transitions the virtual camera to match the best-view location and smoothly blends the original camera imagery into the view so that once the desired viewpoint has been matched, the original real-world image is precisely recreated.

In an aspect, in response to reception of a 2D motion, the navigation component 408 can identify two or more original 2D images associated with a potential second location and orientation of the virtual camera. These two or more 2D images can further influence the final choice for positioning of the virtual camera. In particular, the similarity rank component 414 can rank the respective 2D images with respect to similarity of the capture positions of the respective 2D images relative to the potential second location and orientation for the virtual camera. Based on the ranking if a good (high-similarity) 2D image is available, the navigation component 408 will select the second position and orientation for the virtual camera corresponding to that of the 2D image having the closest matched capture position and orientation to the potential second capture position and orientation as the second capture position and orientation for the virtual camera. The transition component 412 can further smoothly transition to the second location and orientation so as to present the best-available imagery at all times and then render selected 2D image.

In a similar aspect, when the navigation component 408 is determining a second position and orientation for the virtual camera based on input requesting movement of the virtual camera in a particular pan, movement, and/or rotation direction, the navigation component 408 can it will seek for and rank "best" views of potential target locations based on available 2D images associated with the potential target locations using the same "similarity" mechanism that would be applied if the user had manually chosen to look at a point in that direction. In another similar aspect, in cases where the navigation component 408 receives user input that directs the virtual camera to orbit around a particular 3D location, the navigation component 408 can identify nearby original 2D image locations. For example, the navigation component 408 can identify 2D images having capture positions and orientations near to the locations and orientations passed through by rotating the virtual camera around an anchor point in the direction specified by the user. These 2D images can also be ranked by a "nearness" score, a variant of "similarity," wherein those 2D images having relative capture positions and orientations nearer to the positions and orientations passed through by rotating the virtual camera around the anchor point in the direction specified by the user are ranked with a higher degree of similarity If a leader is found the camera will smoothly transition to that location and viewpoint and the rendering component can render the corresponding leader 2D image. If not, it will simply orbit smoothly and maintain a view toward a selected point. In an aspect, navigation is guided by on-screen buttons whose glyphs update dynamically each time the camera is moved, so that the user is always aware of their navigation options. You can get a collection of 2D images based either on rotation or panning. These possible 2D images can be ranked by similarity based on rotation and panning actions.

The transition component 412 can be configured to facilitate smooth transitions between visualizations or representations of the 3D model. In particular, the transition component 412 can facilitate generating a smooth visual transition from a first representation of the environment at a first perspective and a second representation of the 3D model at a second perspective. This can include transitioning from a 3D representation of the 3D model (e.g., a 3D mesh mixed with 2D image data) to a 2D image, and vice versa, as well as from a 2D image of the 3D model to another 2D image of the 3D model. In order to facilitate smooth transitions, in one or more embodiments, the transition component 412 can determine one or more transition perspectives of the virtual camera relative to the 3D model between the first perspective and the second perspective. For example, if orbiting around a vertical axis from along a rotational arc relative to an anchor point, the transition component 412 can identify one or more transition perspectives relative to the anchor point along this arc. The transitioning component 412 can further determine or generate one or more transition representations of the 3D model between the first perspective and the second perspective based on the one or more transition perspectives. These transition representations can include 2D images having capture positions associated with the transition perspectives as well as novel views of the 3D model associated with the transition perspectives including combined 3D mesh and 2D image data. In various embodiments, the transitioning component 412 can determine or generate a sequence of two or more transition representations and the rendering component 410 can render the respective transition representation in order over a transition period (e.g., less than a few seconds) between movement of the virtual camera from the first perspective to the second perspective. The rendering component 410 can further blend these transition representations over a transition period as they are sequentially rendered.

For example, in various embodiments, in response to user navigational input while navigating about a 3D model of an object or environment, the navigation component 408 can be configured to position the virtual camera relative to the 3D model at a position and orientation corresponding to an original capture position and orientation of a 2D image of the of the object or environment. However, the navigation component 408 and the transition component 412 are not restricted to only positioning the virtual camera at positions and orientations corresponding to original 2D image capture positions and orientations. In particular, the navigation component 408 and the transition component 410 can position the virtual camera at virtually any position and orientation relative to the 3D model, including positions and orientation for which an original 2D image was not captured. This allows for smooth transitions between representations of the 3D model (e.g., from a 2D image to another 2D image or from a 3D representation to a 2D image and vice versa), and the ability to provide novel perspectives of the object or environment represented by the 3D model, including wider views than those made by the original scan 2D images. This ability is also required for virtual reality headset displays, where each eye is presented with slightly-different stereo viewpoints.

In one or more implementations, for or such novel views (e.g., including combined 2D and 3D data), the navigation component 408 and/or the transition component 412 can identify available 2D image data from some number of original 2D captures and the projection component 416 can project the 2D image data onto the 3D surface textures of a base 3D model/mesh, overlaying and replacing the base mesh texture with a strength based on correlation of the current view to that of the original scan frames. For example, in an aspect, the projection component 416 can assign potential 2D image a weighted score similar but not identical to the "similarity" score used for navigation, and determined in real-time for each 2D image. For example, in or more embodiments, in association with selecting a 2D image for rendering based on navigational input, the similarity ranking component 414 is configured to compare a desired position and orientation for the virtual camera (e.g., determined based on received user input) relative to capture positions and orientations of available 2D images. The similarly ranking component 414 can further determine and assign a similarity score to the respective 2D images that accounts for a degree of similarity between the desired position and orientation of the virtual camera and the capture positions and orientations of the 2D images, wherein the closer the respective positions and orientations, the higher degree of similarity and the higher the similarity score. The navigation component 408 and/or the rendering component 410 can further select the 2D image associated with the highest similarity score as the "best match" and render that 2D image.

However, in association with projecting 2D image data onto an underlying 3D mesh of the 3D model to generate a novel representation of the 3D model, (e.g., not corresponding to an actual capture position and orientation of a 2D image), the projection component 416 does not have to employ such a high degree of scrutiny when selecting one or more 2D images for projection onto the 3D mesh. For example, given a chosen position and orientation for the virtual camera associated with a perspective of the 3D model that is not associated with an original 2D image capture position and orientation, the navigation component 408 and/or the transition component 412 can look for 2D images of the 3D model that are associated with capture positions and orientations near the chosen capture position and orientation. However, it is more important that the capture orientation being close to the chosen orientation than the capture position being close to the chose position. For example, as long as the capture orientation of a 2D image is substantially close to the chosen orientation, if the capture position is slightly off, the 2D image can still provide good 2D image data for projecting onto the 3D mesh. Accordingly, in some implementation, the projection component 416 or the similarity ranking component 414 can determine a weighted similarity score for 2D images having capture positions and orientations near a chosen virtual camera position and orientation, wherein the orientation factor is more heavily weighted than the position factor. Thus a first 2D image having a closer capture orientation to the chosen orientation relative to a second 2D image yet having a same capture position as the second 2D image will be given a higher weighed similarity score. In some implementations, the projection component 416 can select a subset (of one or more) of the 2D images having the highest weighted similarity scores for projecting onto the 3D mesh. The rendering component 410 can further blend the projections onto the underlying mesh (and one another) in order from highest to lowest weighted similarity scores so that optimal imagery get precedence. Edge boundaries between projected frames are also smoothly blended to avoid apparent mismatches with one another or the geometry, thus providing optimal fidelity for all novel views (in the reductive, minimum case where the camera exactly matches an original view location, the exactness of that view will reach the maximum, and no other lower-ranked projections will be visible—the original view will be exactly recreated).

Figure 8:
FIG. 8 presents an example visualization demonstrating how multiple 2D images can be projected onto a 3D mesh to facilitate generating a novel representation of a 3D model in accordance with various aspects and embodiments described herein.

For example, FIG. 8 presents an example visualization 800 demonstrating how multiple 2D images can be projected onto a 3D mesh to facilitate generating a novel representation of a 3D model in accordance with various aspects and embodiments described herein. The visualization 800 includes a perspective of a 3D model of an office interior including 2D image data of the office interior that has been projected onto a generated 3D mesh of the office interior. In an aspect, the projected 2D image data can be taken from two or more different 2D images and projected onto the underlying 3D mesh. Visualization 800 exemplifies projection of such 2D image data by suppressing the underlying 3D mesh. For example, in visualization 800, only projected colors from corresponding original 2D images are displayed in detail (e.g., the garbage can, the plants, the chair, etc.) and the underlying 3D mesh textures are shown as with a suppressed texture (e.g., with only white and grey color with little or no texture). It should be appreciated that visualization 800 is not a final representation and is merely provided to illustrate projection 2D image data onto a 3D mesh. The resulting/final 3D representation (not shown) will combine this 2D image data detail with the reconstructed 3D mesh texture to provide the highest available quality representation.

Referring back to FIG. 4, the frames used for generation and presentation of novel views/perspectives of an environment include both frames already selected by users as navigation targets, as well as frames chosen automatically by navigation component 408 and/or rendering component 410. Their total number is determined according to the limits of the presentation platform: its GPU and graphics API, its available storage, and the available communications bandwidth for sending images.

For simpler/older viewing devices, only a small number of frames are added to the mesh texture, using a single direct rendering pass. For more capable devices, images are accumulated through multiple rendering passes, in a manner similar to "deferred rendering" where per-pixel geometric details are stored in 2D buffers and colors from applicable original scan frames are accumulated into the final result, one pass at a time. This second method allows us to bypass the resource limits of present-day graphics APIs. The system can then instead be dynamically tuned based on immediate hardware and network context, to reach desired bandwidth and frame-rate goals.

In certain cases, closely-overlapping 2D images can be pre-accumulated into a single, larger and wider view to be used in place of those original images, respectively. System 400 can also be used as the input to other display systems, which will be described later under "Application to Showcase-Style Models."

Typically, mobile-captured models are not "airtight," and there may be areas where inadequate data was captured for the creation of an accurate 3D mesh model, but which may appear in novel views of the 3D mesh model. In such circumstances, the rendering component 410 and/or the projection component 418 can dynamically add 2D image data projected on dynamically created 3D surfaces placed behind the primary 3D mesh for hole filling. According to these scenarios, such view dependent geometry only appears in representations of a 3D model when an associated 2D image is being projected onto a 3D mesh for the representation. For example, if the 3D mesh does not include any holes, the projected 2D image data would be occluded. However, if the 3D mesh did include holes, the projected 2D image data can be placed on dynamically created surfaces (i.e., dynamically created geometry) placed behind the 3D mesh in the areas corresponding to the holes. In the simplest case of dynamic geometry, the rendering component 410 can use a view-aligned plane placed just beyond the boundaries of the 3D model, and texture-mapped with the color image of the associated view. Other possible dynamic geometries include sheets that roughly follow the depth range of the associated scan and regions of the reconstructed 3D mesh. When viewed from the associated original view location, textures on such dynamic background geometry will fill any holes in the 3D mesh, even providing imagery for areas where no valid mesh could be reconstructed (e.g., because the view was out of the original scanner depth range, through an interfering window, etc).

In various embodiments, dynamic geometry is added and subtracted smoothly from the scene based on an exactness function like that used for projected scan textures. As the virtual camera transitions between 3D locations, inexact projection matches smoothly fade out while new more-exact ones may appear to create a sense of location even for extremely sparse 3D meshes. This smooth blending reduces the visibility of any depth mismatch between the scanned geometry and the dynamic geometry and allows further smooth transitions through the scene.

Figure 9:
FIG. 9 presents an example visualization of an environment demonstrating projection of two-dimensional image data captured of the environment onto a three-dimensional mesh generated for the environment in accordance with various aspects and embodiments described herein.

For example, FIG. 9 presents an example visualization 900 that includes a 3D model of an environment generated using 2D and 3D data of the environment captured by a mobile device in accordance with various aspects and embodiments described herein. Visualization 900 shows the limits of the 3D mesh as indication by the wireframe outlines 902. The remaining area 904 of the visualization has have been filled with original 2D imagery projected onto a dynamically-placed background (e.g., by projection component 418).

With reference back to FIG. 4, in addition to employing 2D image data for projecting additional color data onto a 3D mesh and for hole filling, rendering component 410 can apply depth to enhance projection mapping of 2D images on a 3D mesh. In an aspect, the 3D mesh data may include regions that were occluded from the viewpoint of any specific scan frame. In this scenario, rendering component 410 can apply a mixture of shadow mapping and the use of any available original scanned depth data as an occlusion map, to ensure that areas in novel views that may have not been visible from the viewpoint of the original scan are displayed using either colors from a different viewpoint or the underlying mesh textures.

To determine occlusion regions, rendering component 410 can apply both the original depth data, when available, and synthetic depth maps derived from the 3D mesh. Original scans have ensured alignment with the color images, but limited range and a large variety of scanning artifacts based on current technical limitations caused by scan-time environmental factors. Projections based upon the 3D mesh generally have a more complete version of the scene, but which can be vulnerable to projection mis-alignments due to factors such as original-scan motion blur. Projection errors that remain tend to be low-contrast, and at view angles with large divergence from the original, they are smoothly faded-out by the renderer regardless.

Any number of scan frames can be combined in this method, according to the capabilities of the device. Since projections are layered onto a textured solid mesh, and ordered according to similarly or weighted similarity, and because most similar views are blended last, on "top" of less similar views, no blend-normalization step is required, as would be used in light-reconstruction methods. This mixture of projected 2D imagery on textured 3D reconstructed geometry can provide visualization with greater detail and color fidelity than meshing or light-reconstruction methods alone, especially around surfaces that are difficult to scan due to complexity (e.g., plants with many leaves, translucent materials, very fine details, etc) or lack of a specific surface at all (e.g., a furry rug). This is also especially useful for creating views where scan data is incomplete, which is a likely scenario for many future scans that will be created by untrained users or in an offhanded manner, or in difficult locations.

Figure 10:
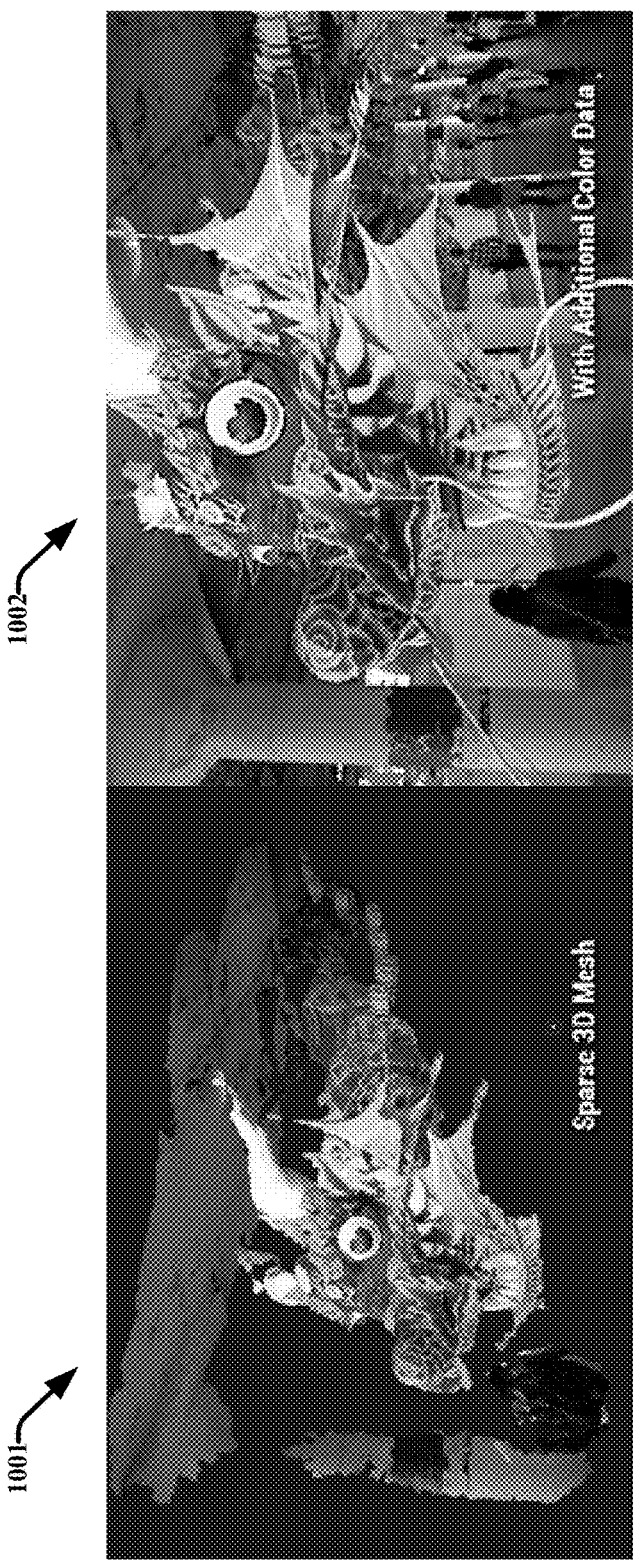
FIG. 10 presents example reconstructed 3D representations 1001 and 1002 of an environment including a paper dragon in a large room in accordance with various aspects and embodiments described herein.

For example, FIG. 10 presents example reconstructed 3D representations 1001 and 1002 of an environment including a paper dragon hanging in a large room in accordance with various aspects and embodiments described herein. Visualization 1001 includes a representation of the environment generated with only (or substantially only) 3D mesh data. As exemplified in visualization 1001, small details and large scale backgrounds are beyond the depth scan capabilities of the mobile 3D capture device. Accordingly, the 3D mesh is sparse. Representation 1002 demonstrates a resulting 3D representation after 2D imagery of the environment is projected on the spare 3D textured mesh of visualization 1001. As can be seen in representation 1002, the added additional color from the 2D imagery onto dynamic background geometrical planes provides a better context for the 3D mesh.

Figure 11:
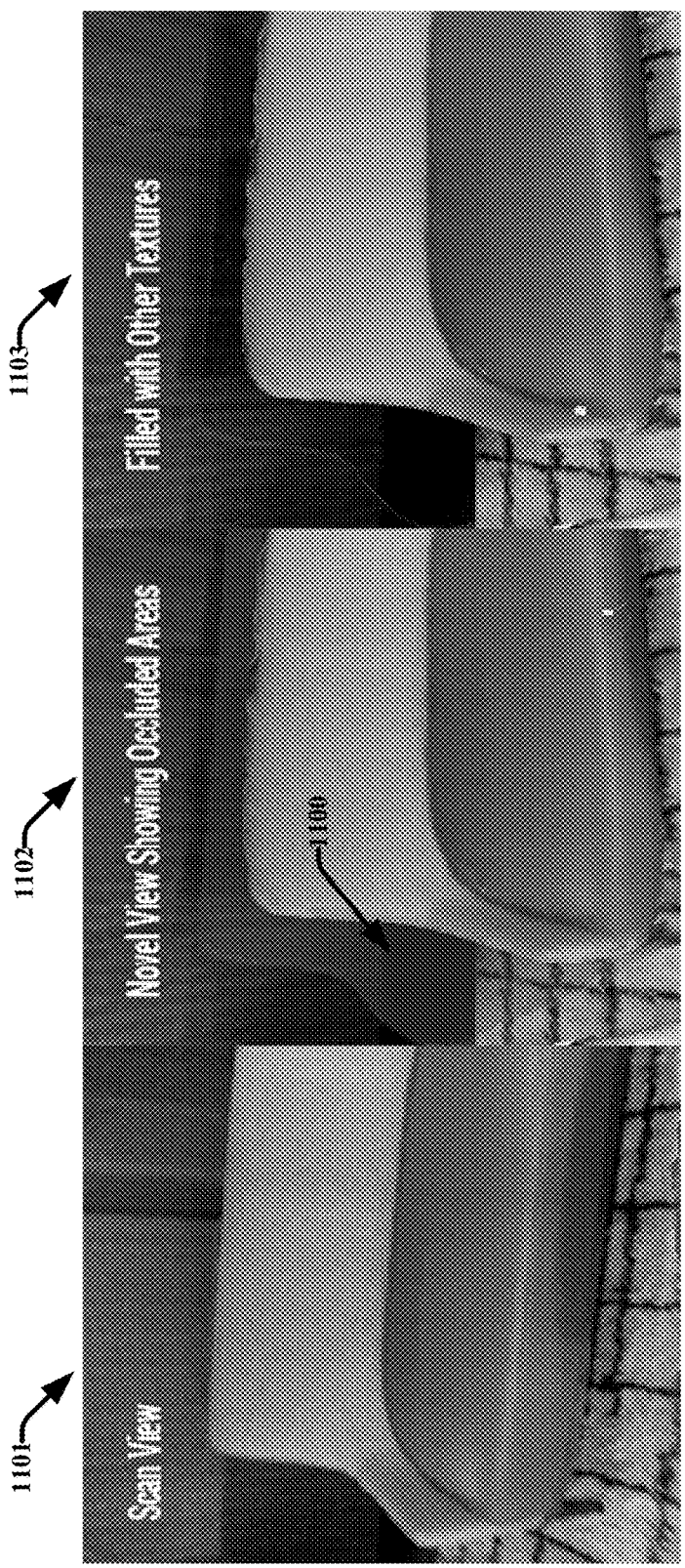
FIG. 11 presents example visualizations demonstrating usage of occlusion mapping to apply other textures from different views or of the underlying 3D mesh in accordance with various aspects and embodiments described herein.

FIG. 11 presents example visualizations demonstrating usage of occlusion mapping to apply other textures from different views or of the underlying mesh in accordance with various aspects and embodiments described herein. Visualization 1101 depicts a 3D representation (including a 3D mesh) of the sofa generated based on a scanned view that includes all 2D pixels included in the 3D scan. Visualization 1102 depicts an example view of the same 3D representation of visualization 1101 showing occluded areas 1100 behind the sofa associated with visualization 1101 that were not included in the original 3D scan data. Visualization 1103 depicts a new novel view of the sofa wherein the occluded area 1100 has been filled with other textures from one or more different views or of the underlying 3D data. The source of other texture data can be selected from other 2D images and/or other 3D mesh data. Visualization 1101 is thus enhanced by projecting the original scan. When the camera position does not match the original scan, previously-occluded areas will be made visible. The surface of the sofa is still colored according to the detailed original scan.

Application to Showcase-Style Models

As mentioned above, not all currently-available devices can support complex texture layering Likewise, not all devices have high-bandwidth access to large numbers of captured 2D images. Thus in various embodiments, rendering component can also use the above rendering methods offline to pre-render unified panoramas or larger field of view images of interior views and save them as a collection of images or panoramic cube maps for use by other systems. For this application, rendering component 408 determines optimal locations for the panoramas or larger field of view images, pre-renders them, then bundles them with the reconstructed 3D mesh to create a complete media object that can be viewed and shared by another existing 3D modeling and rendering infrastructure.

According to this embodiment, by applying a variant of the "similarity" score as the scoring criterion for automated clustering algorithms, the disclosed systems can quickly determine optimal locations for synthetic panoramas to be rendered. The rendering component 408 can further render views of the 3D model from those locations, using all available data and projections, and then store the resultant renderings to disk for later recall.

Figure 12:
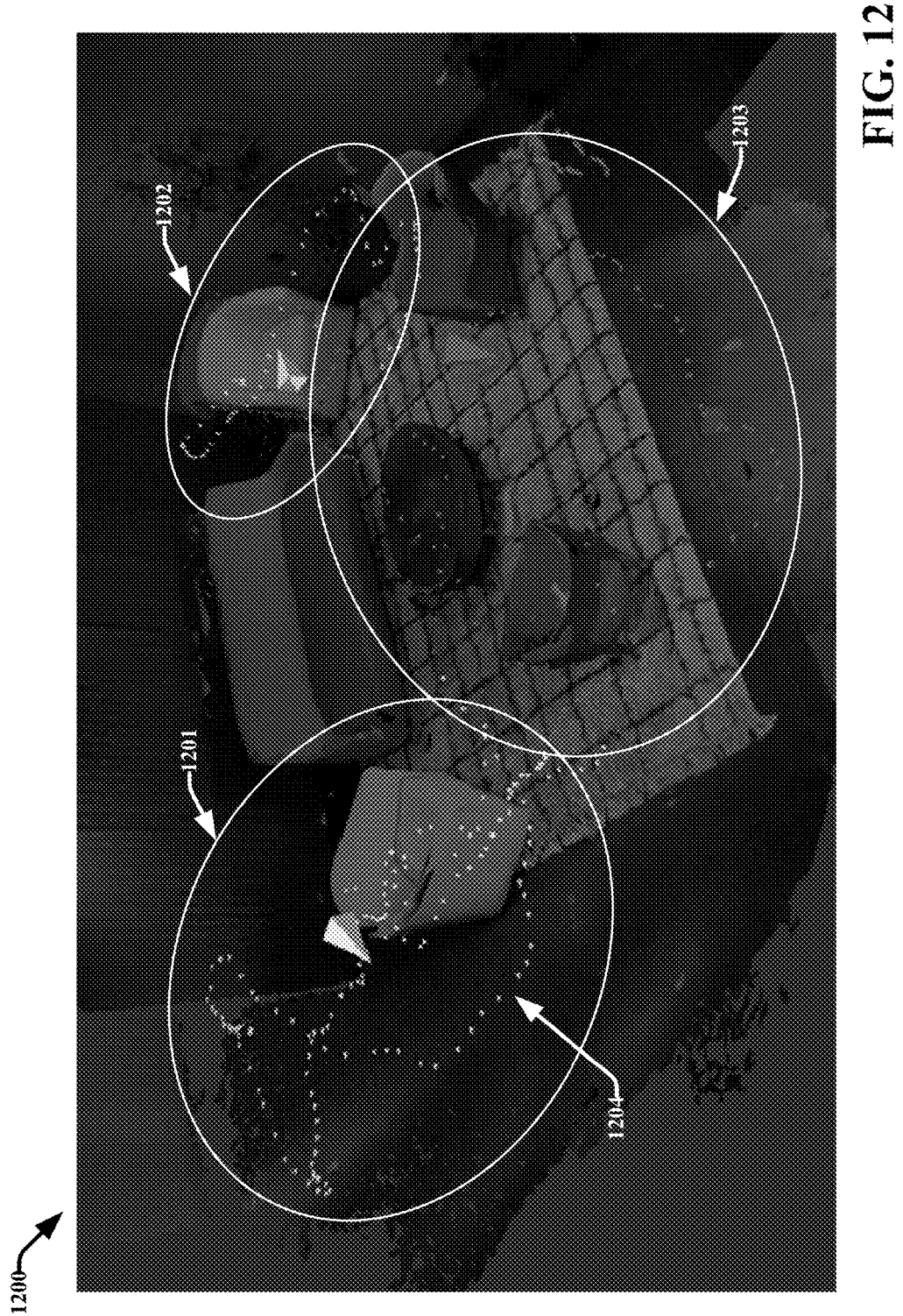
FIG. 12 presents an example three-dimensional visualization of an environment generated using two-dimensional and three-dimensional image data captured of the environment and including trace lines depicting movement of a camera through the environment during the capture process in accordance with various aspects and embodiments described herein.

For example, FIG. 12 presents an example representation 1204 of a 3D model of an environment generated using 2D and 3D data of the environment captured by a mobile device in accordance with various aspects and embodiments described herein. Representation 1200 includes a 3D scene showing original scan locations, as indicated by the dots or dashes of the trace lines 1204. In an aspect, these scan locations are automatically grouped into clusters (e.g., clusters 1201, 1202 and 1203 roughly) of optimal locations for synthetic panoramas (large frustums). When scanning with the intent of rendering via an alternate 3D modeling rendering infrastructure, users can either "seed" the scan collection by providing lots of scans from one location (e.g., the capture system can guide them to mimic the motions of a capturing a panorama on a tripod mounted camera), which will also be recognized by the clustering algorithm (because there will be a high density of similar views—a cluster). As shown in visualization 1200, this behavior, while optimal, is not required. In one or more implementations, the panoramas would be rendered as six individual cube faced views each made in a different cardinal direction from the selected cluster point using the same rendering methods described herein for generating novel representations based on mixed 2D and 3D medial. These views would be generated offline before user viewing and be associated with the 3D model.

Applications for Enhanced Photography

Adding depth information to color images allows for enhancements that would not be otherwise available. Unfortunately, the limited range and other artifacts of real-world depth scanners have left most of these potential enhancements unavailable. However, the disclosed unified methods of integrating data from multiple views to create a coherent depth signal combining original photography and synthetic 3D imagery enable application of subtle contouring effects that enhance the feeling of dimensionality back to those original photos and video scans. The disclosed techniques can also be applied while rendering new views in 3D, either interactively or to other synthetic images like the panoramas described above.

Figure 13:
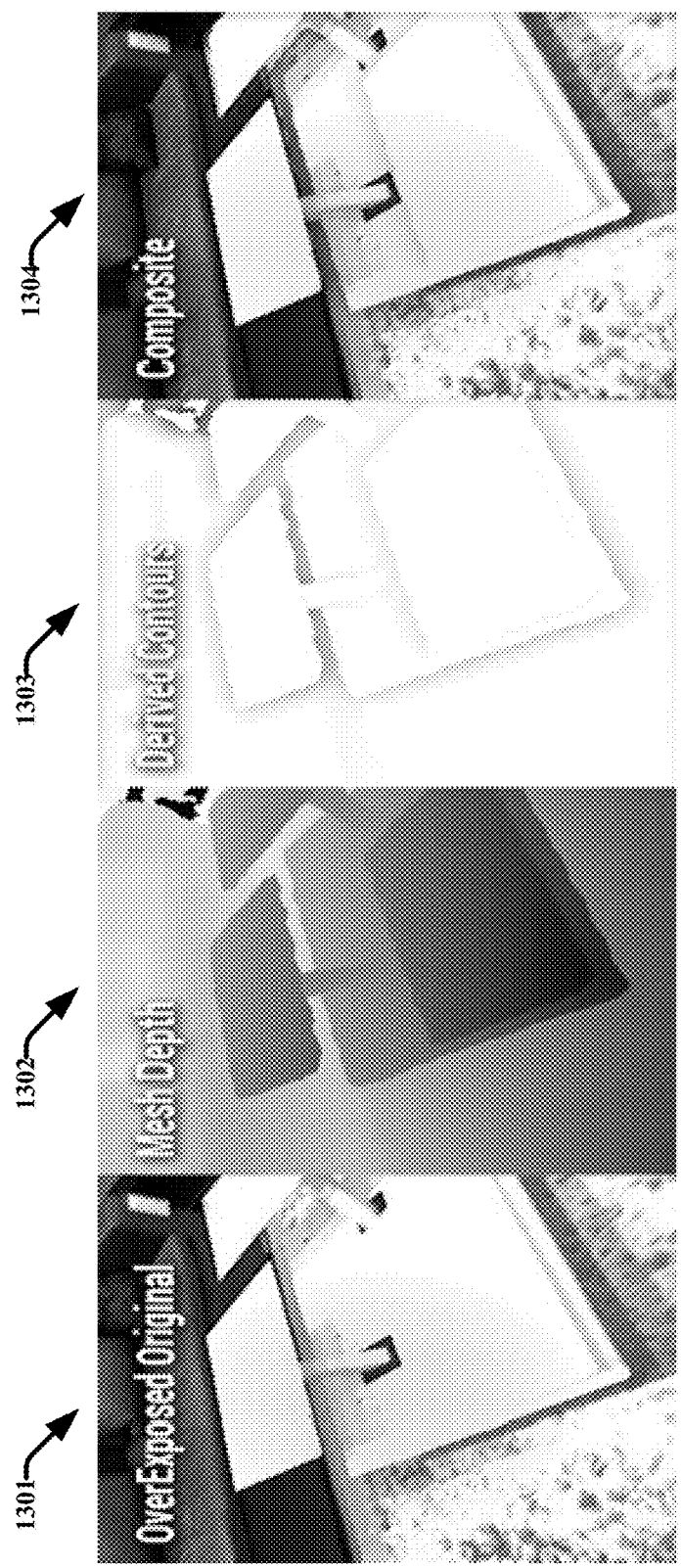
FIG. 13 presents example views of an image enhanced via utilization of combined three-dimensional and two-dimensional image data in accordance with various aspects and embodiments described herein.

For example, FIG. 13 presents example views of an image of an object enhanced via utilization of combined 2D and/or 3D image data of the object in accordance with various aspects and embodiments described herein. The object is a coffee table with three different surfaces having different planes. View 1301 includes an original overexposed 2D image of the coffee table in which essential detail of the coffee table, such as the three different surfaces associated with different planes, has been lost. In this example view, exposure for the dark sofa (behind the white table) has meant that the white table is completely overexposed and has lost all detail. View 1302 includes a 3D mesh depth image captured from the same camera location as the 2D image in view 1301. View 1303 presents derived contours of the 3D mesh depth image in view 1302. View 1304 depicts a composite image that reveals structure of the coffee table that would have otherwise not been visible in the original overexposed image 1301. In particular, using the mesh depth and the derived contours of images 1302 and 1303, the different surfaces and planes are identified and color or texture data is integrated onto the original 2D image of view 1301 to generate the composite view 1304. This technique allows us to see additional missing detail, which can then be re-introduced as an enhancement.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 14:
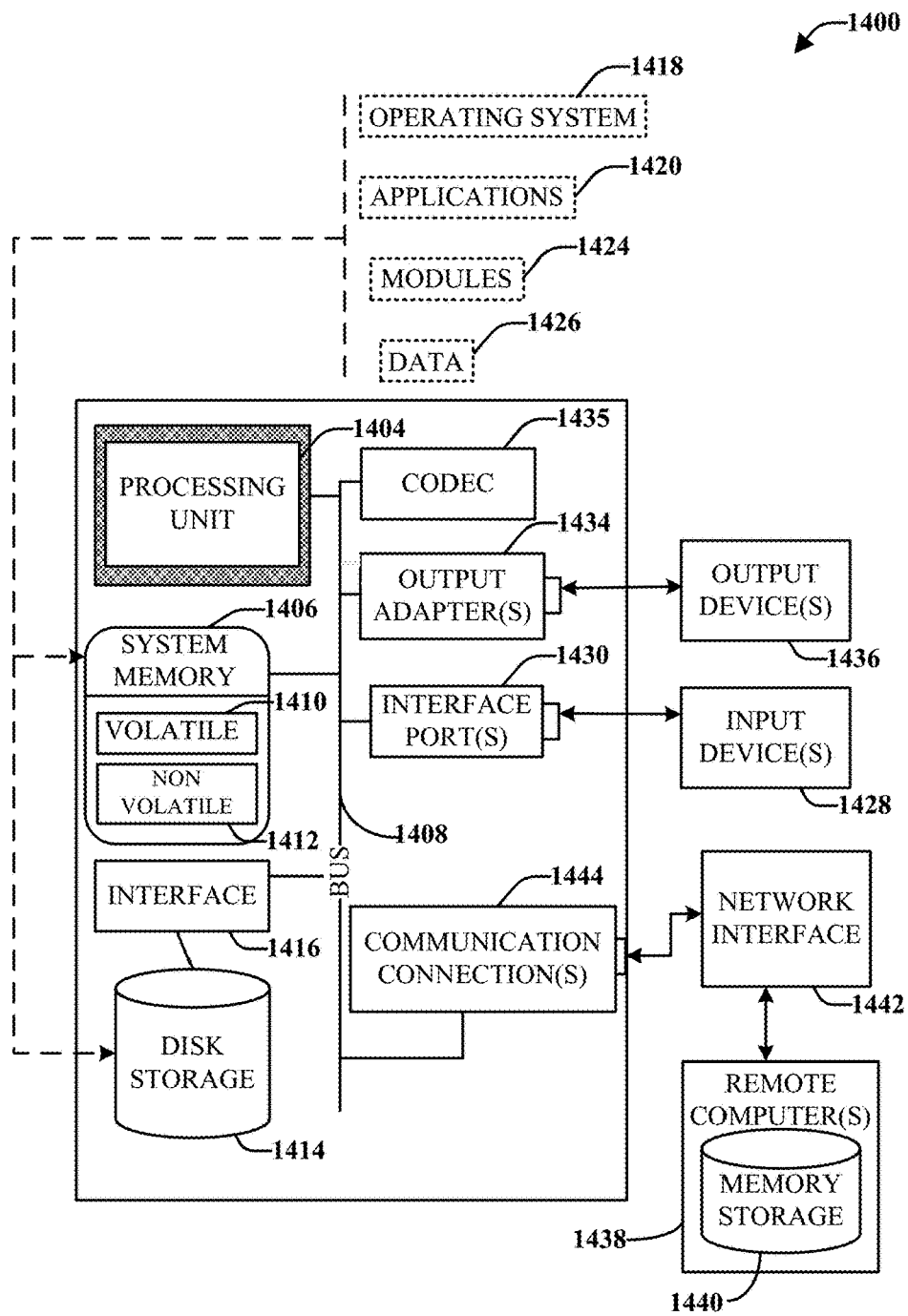
FIG. 14 is a schematic block diagram illustrating a suitable operating environment in accordance with various aspects and embodiments.

With reference to FIG. 14, a suitable environment 1400 for implementing various aspects of the claimed subject matter includes a computer 1402. The computer 1402 includes a processing unit 1404, a system memory 1406, a codec 1405, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 14144), and Small Computer Systems Interface (SCSI).

The system memory 1406 includes volatile memory 1410 and non-volatile memory 1412. The basic input/output system (BIOS), containing the basic routines to transfer information between elements within the computer 1402, such as during start-up, is stored in non-volatile memory 1412. In addition, according to present innovations, codec 1405 may include at least one of an encoder or decoder, wherein the at least one of an encoder or decoder may consist of hardware, a combination of hardware and software, or software. Although, codec 1405 is depicted as a separate component, codec 1405 may be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), or flash memory. Volatile memory 1410 includes random access memory (RAM), which acts as external cache memory. According to present aspects, the volatile memory may store the write operation retry logic (not shown in FIG. 14) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1402 may also include removable/non-removable, volatile/non-volatile computer storage medium. FIG. 14 illustrates, for example, disk storage 1414. Disk storage 1414 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1414 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1414 to the system bus 1408, a removable or non-removable interface is typically used, such as interface 1416.

It is to be appreciated that FIG. 14 describes software that acts as an intermediary between users and the basic computer resources described in the suitable operating environment 1400. Such software includes an operating system 1418. Operating system 1418, which can be stored on disk storage 1414, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1414. It is to be appreciated that the claimed subject matter can be implemented with various operating systems or combinations of operating systems.

A user enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s). Thus, for example, a USB port may be used to provide input to computer 1402, and to output information from computer 1402 to an output device 1436. Output adapter 1434 is provided to illustrate that there are some output devices 1436 like monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices and/or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

Figure 15:
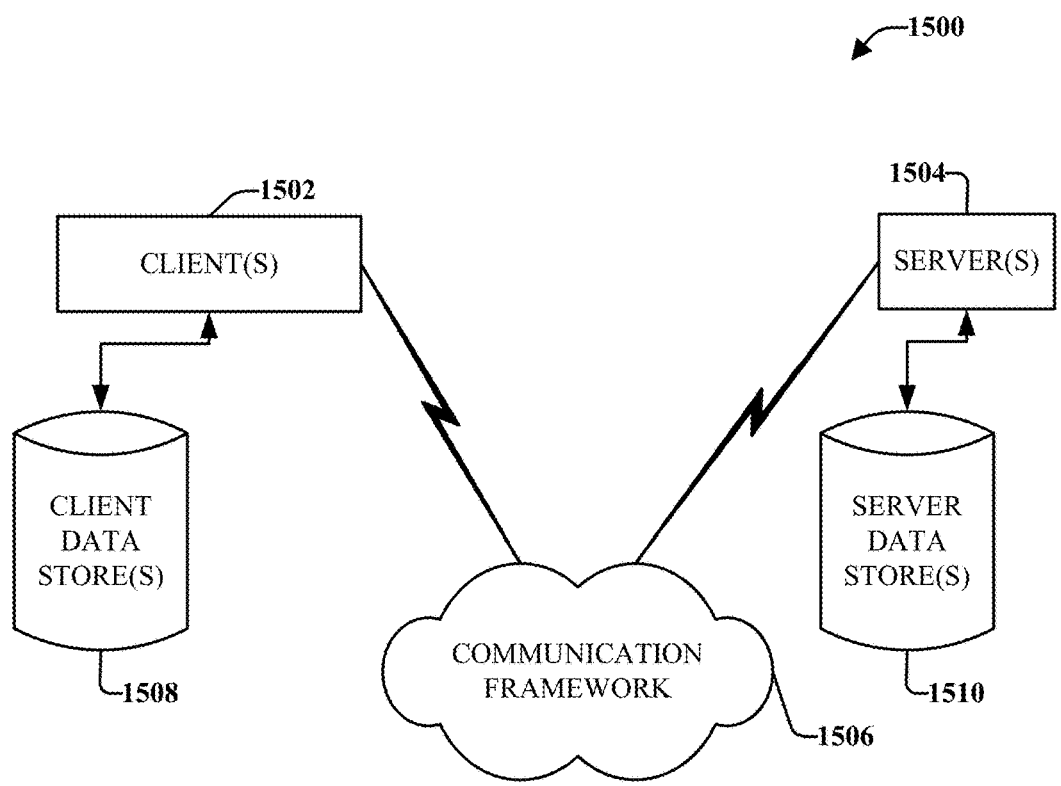
FIG. 15 is a schematic block diagram of a sample-computing environment in accordance with various aspects and embodiments.

Referring now to FIG. 15, there is illustrated a schematic block diagram of a computing environment 1500 in accordance with this disclosure. The system 1500 includes one or more client(s) 1502 (e.g., laptops, smart phones, PDAs, media players, computers, portable electronic devices, tablets, and the like). The client(s) 1502 can be hardware and/or software (e.g., threads, processes, computing devices). The system 1500 also includes one or more server(s) 1504. The server(s) 1504 can also be hardware or hardware in combination with software (e.g., threads, processes, computing devices). The servers 1504 can house threads to perform transformations by employing aspects of this disclosure, for example. One possible communication between a client 1502 and a server 1504 can be in the form of a data packet transmitted between two or more computer processes wherein the data packet may include video data. The data packet can include a metadata, e.g., associated contextual information, for example. The system 1500 includes a communication framework 1506 (e.g., a global communication network such as the Internet, or mobile network(s)) that can be employed to facilitate communications between the client(s) 1502 and the server(s) 1504.

Communications can be facilitated via a wired (including optical fiber) and/or wireless technology. The client(s) 1502 include or are operatively connected to one or more client data store(s) 1508 that can be employed to store information local to the client(s) 1502 (e.g., associated contextual information). Similarly, the server(s) 1504 are operatively include or are operatively connected to one or more server data store(s) 1510 that can be employed to store information local to the servers 1504.

In one embodiment, a client 1502 can transfer an encoded file, in accordance with the disclosed subject matter, to server 1504. Server 1504 can store the file, decode the file, or transmit the file to another client 1502. It is to be appreciated, that a client 1502 can also transfer uncompressed file to a server 1504 and server 1504 can compress the file in accordance with the disclosed subject matter. Likewise, server 1504 can encode video information and transmit the information via communication framework 1506 to one or more clients 1502.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A method comprising:
generating, by a system comprising a processor, a three-dimensional model of an environment using sets of three-dimensional data respectively comprising points that have been aligned relative to a three-dimensional coordinate space, wherein the sets of the three-dimensional data are respectively associated with two-dimensional images of the environment captured by a camera at different capture positions and capture orientations relative to the environment;
facilitating, by the system, navigating and viewing the three-dimensional model as displayed via an interface from different perspectives of a virtual camera relative to the three-dimensional model;
providing, by the system, a representation of the three-dimensional model from a first position and a first orientation of the virtual camera relative to the three-dimensional model corresponding to a first perspective of the three-dimensional model;
determining, by the system, a second position and a second orientation of the virtual camera relative to the three-dimensional model corresponding to a second perspective of the virtual camera relative to the three-dimensional model based on user input indicating movement of the virtual camera from the first perspective to the second perspective; and
identifying, by the system, a two-dimensional image of the two-dimensional images providing a view of the three-dimensional model from the second perspective based on the two-dimensional image having a capture position associated with the second position and a capture orientation associated with the second orientation.

2. The method of claim 1, further comprising, based on the identifying:
facilitating, by the system, transitioning from displaying the representation to displaying the two-dimensional image via the interface; and
facilitating, by the system, generating a smooth visual transition between the representation and the two-dimensional image in association with the transitioning.

3. The method of claim 1, further comprising:
ranking, by the system, the two-dimensional images based a first degree of correspondence between their respective capture positions and the second position, and a second degree of correspondence between their respective capture orientations and the second orientation; and
selecting, by the system, the two-dimensional image for rendering based on the ranking.

4. The method of claim 1, wherein the representation comprises a two-dimensional image and the user input comprises selection of a location on the two-dimensional image as displayed via the interface.

5. The method of claim 1, wherein the user input comprises a type of movement of the virtual camera selected from a defined set of movement types included in a group consisting of: pan left, pan right, orbit left around an object, orbit right around an object, move left, and move right, and wherein the identifying the two-dimensional image is based on the type of movement.

6. The method of claim 5, wherein the facilitating comprises rendering interactive buttons on the interface that provide for control of movement of the virtual camera according to the defined set of movement types.

7. The method of claim 1, wherein the determining the second position and the second orientation comprises determining the second position and the second orientation based on a navigation mode and a selected anchor point relative to the three-dimensional model.

8. The method of claim 7, wherein the selected navigation mode comprises a navigation mode selected from a group consisting of: walking mode, a feature view mode, a dollhouse mode, and a floor plan mode.

9. The method of claim 7, wherein the determining the second position and the second orientation further comprises panning the virtual camera from the first perspective to the second perspective relative to the selected anchor point and based on the navigation mode.

10. The method of claim 1, wherein the two-dimensional image comprises a first two-dimensional image, and wherein the method further comprises:
    identifying, by the system, a second two-dimensional image of the two-dimensional images having a second capture position associated with the first position and a second capture orientation associated with the first orientation; and
    combining, by the system, the first two-dimensional image and the second two-dimensional image to generate a third two-dimensional image of the environment from the second perspective and having a wider field of view of the environment relative to the first two-dimensional image or the second two-dimensional image.

11. The method of claim 1, further comprising, wherein the representation comprises a first representation and wherein the method further comprises generating, by the system, a second representation of the three-dimensional model from the second perspective, comprising:
    generating, by the system, a three-dimensional representation of the three-dimensional model from the second perspective; and
    projecting, by the system, image data of the two-dimensional image onto the three-dimensional representation.

12. The method of claim 11, wherein the generating the second representation further comprises:
    identifying, by the system, a hole in the three-dimensional representation; and
    filling, by the system, the hole based on the projecting.

13. The method of claim 1, further comprising:
    generating, by the system, a three-dimensional representation of the three-dimensional model from the second perspective;
    identifying, by the system, an occluded region in the three-dimensional representation; and
    employing, by the system, shadow mapping and depth data associated with the occluded region to identify an area or volume of the three-dimensional model corresponding to the occluded region.

14. The method of claim 13, further comprising:
    identifying, by the system, image data included in one or more sets of the sets of three-dimensional data and associated with area or volume; and
    applying, by the system, the image data to the occluded region in the three-dimensional representation.

15. The method of claim 14, wherein the image data comprises color data from the one or more sets that was captured at different positions and orientations relative to the occluded region.

16. The method of claim 14, wherein the image data comprises texture data from the one or more sets that was captured at different positions and orientations relative to the occluded region.

17. The method of claim 1, wherein the representation comprises a first representation and wherein the method further comprises:
    identifying, by the system, three-dimensional mesh data associated with the three-dimensional model and the second perspective; and
    generating, by the system, a second representation of the three-dimensional model from the second perspective by combining the two-dimensional image and the three-dimensional mesh data, wherein the second representation has a wider field of view of the three-dimensional model relative to the two-dimensional image alone.

18. A system comprising
a processor; and
a memory that stores executable instructions that, when executed by the processor, facilitate performance of operations, comprising:
    receiving navigational input in association with navigation of a three-dimensional model of an object or environment, wherein the navigational input indicates a request to move a virtual camera from a first perspective of the three-dimensional model to a second perspective of the three-dimensional model;
    determining, based on the navigational input, a second position and a second orientation for the virtual camera relative to the three-dimensional model corresponding to the second perspective;
    identifying two or more two-dimensional images captured of the object or environment having capture positions or capture orientations that have a defined degree of similarity to the second position or the second orientation, respectively; and
    combining the two or more two-dimensional images to generate a representation of the three-dimensional model based on the second position and the second orientation.

19. The system of claim 18, wherein the representation comprises a second representation and the receiving the navigational input comprises receiving the navigational input relative to a first representation of the three-dimensional model, wherein the operations further comprise:
    transitioning from rendering the first representation to rendering the second representation based on the receiving the navigational input.

20. The system of claim 18, wherein the generating the representation of the three-dimensional model comprises:
    identifying a two-dimensional image captured of the object or environment having a capture position and a capture orientation that corresponds to the second position and the second orientation, respectively, wherein the representation comprises the two-dimensional image.

21. A non-transitory machine-readable storage medium, comprising executable instructions that, when executed by a processor, facilitate performance of operations, comprising:
    providing a first representation of a three-dimensional model of an object or environment from a first position and a first orientation of a virtual camera relative to the three-dimensional model corresponding to a first perspective of the three-dimensional model;
    receiving navigational input in association with navigation of the three-dimensional model, wherein the navigational input indicates a request to move the virtual camera from the first perspective to a second perspective of the three-dimensional model;

determining, based on the navigational input, a second position and a second orientation for the virtual camera relative to the three-dimensional model corresponding to the second perspective; and identifying, a two-dimensional image included in a set of two-dimensional images captured of the object or environment that provides a view of the three-dimensional model from the second perspective based on the two-dimensional image having a capture position associated with the second position and a capture orientation associated with the second orientation.

22. The non-transitory machine-readable storage medium claim 21, wherein the operations further comprise:

based on the identifying, facilitating transitioning from displaying the first representation to displaying the two-dimensional image via the interface.

23. The non-transitory machine-readable storage medium claim 21, wherein the two-dimensional image comprises a first two-dimensional image, and wherein the operations further comprise:

identifying a second two-dimensional image included in the set of two-dimensional images having a second capture position associated with the first position and a second capture orientation associated with the first orientation; and combining the first two-dimensional image and the second two-dimensional image to generate a second representation of the three-dimensional model from the second perspective.

* * * * *